(12) United States Patent
Konnersman

(10) Patent No.: US 6,877,153 B2
(45) Date of Patent: Apr. 5, 2005

(54) COMPUTER-BASED SYSTEM FOR WORK PROCESSES THAT CONSIST OF INTERDEPENDENT DECISIONS INVOLVING ONE OR MORE PARTICIPANTS

(76) Inventor: Paul M. Konnersman, 272 Ocean Ave., Marblehead, MA (US) 01945-3730

(*) Notice: Subject to any disclaimer, the term of this patent is extended or adjusted under 35 U.S.C. 154(b) by 0 days.

(21) Appl. No.: 09/171,043
(22) PCT Filed: Apr. 10, 1997
(86) PCT No.: PCT/US97/05969
§ 371 (c)(1),
(2), (4) Date: Oct. 9, 1998
(87) PCT Pub. No.: WO97/38386
PCT Pub. Date: Oct. 16, 1997

(65) Prior Publication Data
US 2003/0154121 A1 Aug. 14, 2003

Related U.S. Application Data
(60) Provisional application No. 60/016,080, filed on Apr. 10, 1996.

(51) Int. Cl.[7] ............................................. G06F 9/44
(52) U.S. Cl. ................... 717/100; 717/101; 717/102
(58) Field of Search ...................... 717/100, 101, 717/102, 103, 108, 116, 120, 121; 707/163; 395/333, 650; 705/9; 345/333

(56) References Cited

U.S. PATENT DOCUMENTS

| | | | | |
|---|---|---|---|---|
| 5,208,748 A | | 5/1993 | Flores et al. ................. 364/419 |
| 5,216,603 A | | 6/1993 | Flores et al. ................. 364/419 |
| 5,301,320 A | * | 4/1994 | McAtee et al. ................. 705/9 |
| 5,446,842 A | | 8/1995 | Schaeffer et al. ...... 395/200.01 |
| 5,490,097 A | * | 2/1996 | Swenson et al. ............ 364/578 |
| 5,535,322 A | | 7/1996 | Hecht ........................ 395/155 |
| 5,710,896 A | * | 1/1998 | Seidl ........................... 345/333 |
| 5,774,661 A | | 6/1998 | Chatterjee et al. ...... 395/200.33 |
| 5,848,271 A | | 12/1998 | Caruso et al. ............... 395/680 |
| 5,999,911 A | * | 12/1999 | Berg et al. ...................... 705/9 |
| 6,023,702 A | | 2/2000 | Leisten et al. .............. 707/100 |
| 6,122,633 A | * | 9/2000 | Leymann et al. ............. 707/10 |

(Continued)

FOREIGN PATENT DOCUMENTS

| | | |
|---|---|---|
| EP | 0 592 072 | 4/1994 |
| EP | 615198 | 9/1994 |
| GB | 2336695 A * | 10/1999 |
| WO | WO 94 18620 | 8/1994 |

OTHER PUBLICATIONS

Aversano et al., "Introducing e service in business process model", ACM SEKE, Jul. 15–19, 2002, pp 481–488.*

Shegalov et al, "XML enabled workflow managemnt for e service across heterogenous platforms", The VLDB Jour.m 10: 91–103, 2001.*

Shihabi et al, "A framework for modeling human like driving behavior for autonomous vehicle in driving simulators", ACM Agents, May 28–Jun. 1, 2001, pp 286–291.*

(Continued)

Primary Examiner—Anil Khatri

(57) ABSTRACT

A computer-based method and apparatus for the analysis, specification and support of work processes. The system is designed to support multiple interdependent decisions, at least some of which require collaboration among multiple participants (116). Work processes are modeled using an application framework (99) used to develop abstract, decision (100) process models. The decision (100) process models are used as a pattern to instantiate concrete process models that incorporate the work defined by the abstract process. The process model is then used to instantiate project models that incorporate the required work from the process. The project models are used to direct and guide the behavior of the participants (116) in the work process.

46 Claims, 17 Drawing Sheets

U.S. PATENT DOCUMENTS

| | | | | | |
|---|---|---|---|---|---|
| 6,144,967 | A | * | 11/2000 | Nock | 717/1 |
| 6,154,848 | A | * | 11/2000 | Igarashi et al. | 714/4 |
| 6,278,977 | B1 | * | 8/2001 | Agrawal et al. | 705/7 |
| 6,421,700 | B1 | * | 7/2002 | Holmes et al. | 718/100 |
| 6,507,844 | B1 | * | 1/2003 | Leymann et al. | 707/8 |
| 6,631,354 | B1 | * | 10/2003 | Leymann et al. | 705/8 |
| 6,725,428 | B1 | * | 4/2004 | Pareschi et al. | 715/530 |
| 6,772,407 | B1 | * | 8/2004 | Leymann et al. | 717/100 |

OTHER PUBLICATIONS

Visser et al, "Using predicate abstration to reduce object orienetd programs for model chekcing", AMC FMP, 2000, pp 3–12.*

Ellmer, E.., et al., "Requirements Management and its Support by Process–centered Environments," Proceedings of the Second International Workshop on Requirements Engineering.

Jun. 12–13, 1995, 12 pp., Foundation for Software Quality, Jyvaskyla, Finland.

Katz, D. and Kahn, R., The Social Psychology of Organizations, 1966, pp. 48–50 and 171 174, Wiley: New York, NY.

Pohl, K., et al., "Decision Oriented Process Modeling." Proceedings of the 9th International Software process Workshop, Arlie, VA, Oct., 1994, 5 pp., IEEE CS Press: NY, NY.

Zendler, A., et al., A Conceptual Framework for Application Systems Modeling, Oct., 1994, 22 pp., Forschungsinstitut für Angewandte Software–Technologie: München, Germany.

Aalst, W.M.P. van der, et al., "Framework For Business Process Redesign," Proceedings of the Fourth Workshop on Enabling Technologies: Infrastructure for Collaborative Enterprises (WETICE 95), 1995.

Aalst, W.M.P. van der, et al., "A Class of Petri Nets for Modeling and Analyzing Business Processes," *Dept. of Mathematics and Computing Science*, Eindhoven University of Technology, Eindhoven, The Netherlands, 1995.

Albano, A. et al., "An Object Data Model with Roles," in Agrawal, R., et al. (editors), *Proceedings of the 19<sup>th</sup> VLDB Conference*, Dublin, Ireland, 1993, San Mateo, CA: Morgan Kaufmann, 1993, pp. 39–51.

Beckhard, R. and Harris, R.T., "Changes in Organization Structure/Managing Matrices," *Organizational Transitions: Managing Complex Change*, Intervention Technologies, Reading, MA,: Addison–Wesley, 1977, pp. 69–83.

Brehmer, B., "Organization for Decision Making in Complex Systems," in Rasmussen, J., et al. (editors), *Distributed Decision Making: Cognitive Models for Cooperative Work*, New York, NY: John Wiley, 1991, pp. 335–347.

Chakravarthy, S., et al., "Database Supported Cooperative Problem Solving," *Technical Report UF–CIS–TR–92–046*, University of Florida, Gainesville, FL., Dec. 1992.

Crowston, K., *Towards a Coordination Cookbook: Recipes for Multi–Agent Action*, Ph.D. dissertation submitted to the Massachusetts Institute of Technology, Feb. 1991, pp. 19–73 and pp. 279–339.

Crowston, K., "A Taxonomy of Organizational Dependencies and Coordination Mechanisms," Ann Arbor, MI, Apr. 1996.

Curtis, B., et al., "Process Modeling," *Communications of the ACM*, vol. 35, No. 9, 1992, pp. 75–90.

Galbraith, J., *Designing Complex Organizations*, Reading, MA: Addison–Wesley, 1973, pp. 8–21; "Alternative 4: Creation of Lateral Relations: Lateral Processes," pp. 46–66 and "Authority and Responsibility in Lateral Relations," pp. 142–150.

Georgakopoulos, D., et al., "An Overview of Workflow Management: From Process Modeling to Workflow Automation Infrastructure," *Distributed and Parallel Databases*, vol. 3, Boston, MA: Kluwer, 1995, pp. 119–153.

Gottlob, G., et al., "Extending Object–Oriented Systems with Roles," *Johannes–Kepler–Universität Linz*, Instituts bericht 94.03, May 1994.

Joosten, S., et al., "Fundamental Concepts for Workflow Automation in Practice," *Center for Telematics and Information Technology*, University of Twente, Enschede, The Netherlands, Mar. 12, 1995.

Joosten, S. "Conceptual Theory for Workflow Management Support Systems," *Center for Telematics and Information Technology*, University of Twente, Enschede, the Netherlands, Jul. 5, 1995.

Kappel, G., et al., "TriGS$_{flow}$: Active Object–Oriented Workflow Management," *Hawaii International Conference on System Sciences (HICSS'95)*, 1995.

Kappel, G., et al., "Workflow Management Based on Objects, Rules and Roles," *Bulletin of the Technical Committee on Data Engineering*, IEEE Computer Society, vol. 18, No. 1, Mar. 1995, pp. 11–18.

Kniesel, G., "Objects don't migrate!: Perspectives on Objects with Roles," *Report IAI–TR–96–11*, Institute für Informatik III, Universität Bonn, Bonn, Germany, Apr. 1996, pp. 1–27.

Koopman, P., et al., "Organizational Decision Making: Models, Contingencies and Strategies," in Rasmussen, J., et al. (editors), *Distributed Decision Making: Cognitive Models for Cooperative Work*, New York, NY: John Wiley, 1991, pp. 19–46.

Kuo, D., et al., "A Model for Transactional Workflows," *Australasian Database Conference (ADC96)*, Jan. 29–30, 1996.

Langley, A., et al., "Opening up Decision Making: The View from the Black Stool," *Organizational Science*, vol. 6, No. 3, May–Jun. 1995, pp. 260–279.

Leplat, J., "Organization of Activity in Collective Tasks," in Rasmussen, J., et al (editors), *Distributed Decision Making: Cognitive Models for Cooperative Work*, New York, NY: John Wiley, 1991, pp. 51–73.

Lind, M., "Decision Models and the Design of Knowledge–based Systems," in Rasmussen, J., et al. (editors), *Distributed Decision Making: Cognitive Models for Cooperative Work*, New York, NY: John Wiley, 1991, pp. 357–369.

Liptak, J.D., "Linear Responsibility Charting: A Methods Tool," *NACA Bulletin*, May 1956, pp. 1112–1118.

Lonchamp, J., "A Process–Centered Framework for Asynchronous Collaborative Work," *Software Process Technology: Third European Workshop EWSPT'94, Villard De Lance, France, Feb. 1994: Proceedings*, Heidelberg, Germany: Springer–Verlag, 1994, pp. 261–269.

Lonchamp, J., "CPCE: A Kernel for Building Flexible Collaborative Process–Centered Environments," *Software Engineering Environments (SEE '95)*, Noordwijkerhout, The Netherlands, 1995.

Malone, T. W., et al., "The Interdisciplinary Study of Coordination," *ACM Computing Surveys*, vol. 26, No. 1, Mar. 1994, pp. 87–119.

Mentzas, G. N., "Coordination of Joint Tasks in Organizational Processes," *Journal of Information Technology*, vol. 8, 1993, pp. 139–150.

Mintzberg, H., *The Nature of Managerial Work*, New York, NY: Harper & Row, 1973, pp. 12–17 and 76–99.

Mintzberg, H., *Structure in Fives: Designing Effective Organizations*, Englewood Cliffs, NJ: Prentice hall, 1983, pp. 98–101.

Morgan, G., *Images of Organization*, Newbury Park, CA: Sage Publications, 1986, pp. 80–84.

Pree, W., *Design Patterns for Object–Oriented Software Development*, Reading, MA: Addison–Wesley, 1995, pp. 119–120.

Rasmussen, J., "Modelling Distributed Decision Making," in Rasmussen, J. et al. (editors), *Distributed Decision Making: Cognitive Models for Cooperative Work*, New York, NY: John Wiley, 1991, pp. 111–142.

Rolland, C., et al., "An Approach For Defining Ways–of–Working," *Information Systems Journal*, vol. 20, No. 4, 1995, pp. 337–359.

Sannes, R., "The Relationship Between Managers, Developers and Users," in Lundberg, Sundgren, B. (Eds.), *Advancing Your Business: People and Information Systems in Concert*, Stockholm, Sweden: EFI Stockholm School of Economics, 1996, pp. XII1–XII22.

Schmidt, K., "Cooperative Work: A Conceptual Framework," in Rasmussen, J., et al. (editors), *Distributed Decision Making: Cognitive Models for Cooperative Work*, New York, NY: John Wiley, 1991, pp. 75–110.

Simon, H.A., "Decision Making and Organizational Design," in Pugh, D.S. (Editor), *Organization Theory: Selected Readings*, second edition, Harmonsworth, Middelsex, UK: Penguin Books, 1984, pp. 202–223.

Taylor, D.A., *Business Engineering with Object Technology*, New York, NY: John Wiley, 1995, pp. 139–141.

Tolis, C., et al., "Using Business Models in Process Orientation," in Lundberg, M. & Sundgren, B. (Eds.), *Advancing Your Business: People and Information Systems in Concert*, Stockholm, Sweden: EFI Stockholm School of Economics, 1996, pp. VIII1–VIII24.

Vroom, V.H., "A Normative Model of Managerial Decision Making," in Pugh, D.S. (Editor), *Organization Theory: Selected Readings*, second edition, Harmonsworth, Middelsex, UK: Penguin Books, 1984, pp. 256–276.

Wegner, P., "Tutorial Notes: Models and Paradigms of Interaction," *OOPSLA Tutorial Notes*, Oct. 1995.

Hollingsworth: "The Workflow Reference Model", Jan. 19, 1995, The Workflow Management Coalition. XP002154804, pp. 8–43.

"Integration of GroupWare with Project Management Via Facilitated Work Sessions", IBM Technical Disclosure Bulletin, IBM Corp., New York, NY, vol. 39, NR. 3, pp. 171–173, XP000581663.

* cited by examiner

Notes: "I" is the number of Inspectors designated for the producing Decision, and "A" is the number of Approvers designated for the producing Decision.

Note: "C" is the number of Consultees designated for the producing Decision.

COMPUTER-BASED SYSTEM FOR WORK PROCESSES THAT CONSIST OF INTERDEPENDENT DECISIONS INVOLVING ONE OR MORE PARTICIPANTS

This application is the National Stage of International Application No. PCT/US97/05969 filed Apr. 10, 1997, which claims the benefit of U.S. Provisional Application No. 60/016,080, filed Apr. 10, 1996.

FIELD OF THE INVENTION

The present invention pertains to the field of computer-supported collaborative work. More specifically it presents a method and apparatus for (1) analyzing the requirements of such work, (2) specifying the process by which such work shall be carried out, (3) instantiating work projects based upon the specified process pattern and (4) implementing computer-based systems to support the execution, control, and improvement of such collaborative work.

BACKGROUND OF THE INVENTION

"Best practice" in accounting, financial transaction processing, order processing, inventory management, and purchasing has benefitted greatly from, and is heavily dependent on, the use of information technology. Although desktop computers have become ubiquitous in other areas of business such as, engineering, marketing, sales and general management, the benefits have been far more modest. In these areas of largely professional and managerial work, computers have been used extensively to support the work of individuals. But information technology has been more difficult to exploit in professional and managerial work that requires significant collaboration among individuals. Three general approaches have been taken to leverage technology in the service of managerial and professional work-workgroup software, workflow software, and decision support software.

Workgroup software focuses on the need for communication among the many participants in managerial and professional work processes. It can be used to breach the organizational boundaries, both within and among organizations, and is adaptable to almost any set of organizational circumstances. Such flexibility can be advantageous when the requirements for communication are poorly understood or constantly changing. However, there are costs incurred for such flexibility. The administration and operation of such applications may become quite complex. Furthermore, it is sometimes advantageous to restrict the forms that a process may take to achieve not only greater economy but increased repeatability and reliability.

Workflow software is grounded in the paper metaphor of document routing. It should be economical in its use of resources and provide high repeatability due to a more restrictive, and therefore more definitive, structure than workgroup software. However, workflow software is better suited to clerical, document processing activities than to managerial and professional work. In contrast to clerical activities in which most decision situations are well understood and can be made by a single individual, managerial and professional work often entails decisions in which a number of people need to collaborate. This essential need for collaboration is the root of the ever present meetings that managers and professionals everywhere bemoan.

Early decision support software used information technology to support individual decision makers with data retrieval and data manipulation capabilities that could significantly enhance the quality of their decisions. Recent efforts have expanded decision support for individual decisions to group settings. However, decision support software does not attempt to structure the roles played in the decision by various individuals, nor does it usually structure the interdependencies of more than a few closely related decisions.

Professional and Managerial Work Processes

Professional and managerial work processes characteristically result, not in products made of wood, steel or plastic, but products that are composed predominately or even entirely of data. Business plans, product specifications, labels, advertisements, computer software, consulting reports, purchase orders, quotations, requests for quotation, and publications of all sorts, are typical products of managerial and professional work processes.

The data assemblies that are produced by managerial and professional work processes, like their physical counterparts, are sometimes built up in stages as sub-assemblies (e.g., the nutritional content section of the food package label, the terms and conditions section of the product quotation). This tiered structure is illustrated by FIG. 1, and more generally and succinctly by FIG. 2.

Each data element, whether elementary, a sub-assembly or final assembly, is the product of a decision. That is, it is selected from two or more alternatives. For example, the color specified in a product specification might be red, green, or blue. The business plan that includes a $3 million advertising budget could have instead, included one for $2.5 or $ 2 million. Or it could have included separate line items for advertising by geographic region, or by type of media, or by product line, or various combinations of these possibilities. What it does contain is a matter of choice (i.e., a decision) and results in data.

The data assemblies that result from managerial and professional work processes are the product of numerous decisions. More importantly, many of these decisions are logically, and therefore temporally ordered. Just as we cannot assemble a computer before we produce its subassemblies, nor its subassemblies before the components it contains, neither can we assemble a business plan or a quotation before we make the decisions that produce the data from which it is assembled. There's a logical requirement that the components exist before the assembly.

In the physical work of manufacturing, there are also temporal precedence requirements that involve the transformation of materials, rather than the assembly of components. Raw material must be reduced to power or a molten state before it can be cast. And it must be cast before it can be machined. Analogously, in managerial and professional work processes data is sometimes required as the raw material for a decision even though it doesn't show up as a component of that decision's result. For example, the decision to label a product either "corrosive" or "non-corrosive" may require a prior determination of the product's pH. The pH is raw material that is processed, perhaps with other data, by the "Corrosive?" decision, but does not become a component of the result of the "Corrosive?" decision. Similarly, the number of households owning fewer than two television sets may be data that is required for the "Market Potential?" decision, but it is not assembled into that decision. However, both the market potential number and the number of households owning fewer than two TV's would probably be components of the assembly, "Product Marketing Plan".

Need for Participation in Decision-Making. For a number of years there has been widespread recognition that it is desirable to get more people involved in important organizational decisions. The decisions made and actions taken in a complex organization composed of interdependent units frequently require contributions and commitments from many individuals if they are to succeed. Although this may seem a recent phenomenon, the interdependence and complexity were always there. In the past most people were not aware of it, nor did they need to be. Organizations ignored much of the complexity and used extra resources (e.g., people, inventories, equipment, time, etc.) to decouple the interdependencies.

But as progressive organizations began to use information technology to reduce the slack in their organizations and to increase their ability to deal with complexity, they gained competitive advantage. Others have had to follow or perish. In most businesses the elimination of slack resources has exposed inadequacies in the organizational infrastructure. The inability to adequately integrate and coordinate decision-making across tightly coupled organizational layers and functions is often a problem.

Involving others in decision-making is a way of integrating and coordinating complex organizational activity. The advantages of a more participative decision process include not only better decisions because of better information, but more readily implementable decisions because of the commitment of the participants to carry it out. Nevertheless, the results from involving more people in decision-making have frequently been disappointing at best and a frustrating waste of time at worst. In the '70's, "participative management" was espoused by academics, promoted by consultants, and loudly proclaimed by many managements. The disappointment, if not disillusionment that followed, was of course predictable. It was yet another case of a very valid and useful idea that was over-promoted and under-invested.

In the '80's "participative management" was superseded by the coming of "teams" with similar results. It is often at least useful, and perhaps essential, for a group of people to work together interactively-as a team. It is seldom adequate however, to roundup a group, anoint them with "teamhood," provide team T-shirts and send them off to play the game. The football, basketball, and other teams that provide the model for organizational teams, don't usually play the game without considerable investment in learning how to "block and tackle" and then practicing the "blocking and tackling" repeatedly until they do it really well. They also develop "play books" and shared understanding of cryptic signals. They learn to anticipate each others moves, again as a result of much practice together. Where are the organizational equivalents of these indispensable requirements for the success of athletic teams? What one usually finds is a one day, or at most one week course, followed by a return to the workplace bearing an appropriately emblazoned coffee mug and plaque for the wall.

Participative decision-making was and is a good idea. However, it is an idea that contains several traps for the unwary. A common trap is the assumption (usually unexamined and unstated) that participation means equality-that everyone who participates, participates in the same way and to the same degree. From that assumption flows the further assumption that everyone gets a vote, that the majority rules or that unanimity or consensus must be achieved if a decision is to be made. While there may be situations where such assumptions are appropriate, in most organizational situations they are neither desirable nor realistic.

A critical omission from many organizational teams is an appropriate set of clearly differentiated roles for the players and a related vocabulary. The "players" need a way to communicate effectively with one another about the "positions" they are playing, the "moves" they intend to make, and what they expect of their colleagues.

We need a method to analyze, specify and support work processes that consist of many, interdependent decisions, at least some of which require collaboration among multiple participants for satisfactory results. This is at least part of an answer to two critical problems currently faced by most complex organizations—1) How to get better integration of effort across organizational boundaries, both those created within organizations (e.g., between engineering and manufacturing, or eastern sales region and central sales region) and the boundaries between organizations (e.g., customer and supplier, business and government, federal government and state government), and 2) How to improve the performance of managerial and professional work, where such performance may be measured in terms of reliability of the process in producing quality output, the productivity of the process, or the speed of the process.

SUMMARY OF THE INVENTION

The present invention provides a novel way of using information technology in support of professional and managerial work processes. The approach is based on the modeling of professional and managerial work processes as networks of multiple, interdependent decisions, some of which may involve multiple participants in specific, differentiated roles. The proposed method entails the modeling of the work process using several familiar entities—decisions, decision rules and data—and another less familiar set of entities—decision roles. The work process model produced using these entities is used as a pattern for the generation of project models. These project models are a central element in a computer—and communications-based infrastructure to direct and guide the behavior of the participants in the work process.

Like both workflow and workgroup software, this approach recognizes the importance of facilitating communication among collaborating individuals. Like decision support software, this approach recognizes the utility of assisting workers with access to appropriate data and the manipulation of that data. Unlike other approaches the proposed approach provides a method for structuring professional and managerial processes modularly using object technology and with a degree of structure that can be varied for each object independently. When understanding of the work process is great, that knowledge can be used to build more highly structured, and therefore more valuable, supporting infrastructure. Where less precise or less fully defined understanding of the work process is all that is available, the proposed method allows a correspondingly less structured supporting infrastructure that can be enhanced as understanding of the process increases.

The exploitation of information technology in support of professional and managerial work has been limited by failure to specify the processes used to accomplish such work. The available tools for modeling and specifying such work have been inadequate. The present invention is based on a methodology that addresses this inadequacy. Professional and managerial work processes are modeled as networks of linked decisions and data. The decisions that make up such work often require significant participation of many people. The approach utilized by the present invention identifies the roles that are useful and provides specifications for the behavior and requirements of individuals playing those roles.

Decision Networks. Every decision produces a result in the form of data. Although any decision may be viewed in isolation, it is useful to identify the data required to make the decision. That data is in turn the result of one or more other decisions. Therefore, the decision that requires data is dependent on the decisions that produce it (See FIG. 3). Therefore, if we establish the interdependencies among decisions based on our understanding of the data they produce and the data they require, we have established a basis for both routing data and triggering decision situations. That is, send a data element to all decisions requiring it, and trigger a decision when all required data has been received.

Each decision is viewed as an "atomic" process-taking required data and processing it to produce a result as output data. The decisions that make up professional and managerial work processes are typically related to other decisions by virtue of their need for data resulting from earlier decisions. FIG. 4 depicts a typical decision process, in this case a proposal preparation process for some equipment. The nodes of the network are the decisions with their associated data output. The decision interdependencies are depicted as directed arcs connecting the nodes. The connecting arcs run from the independent decision at the entry of the arc to the dependent decision at the exit end of the arc which is indicated by an arrowhead. Professional and managerial work processes are treated therefore, as "molecular" networks of such "atomic" decision processes that convert data to a desired output. The method of the present invention couples these decision networks to a structure for participation by multiple individuals in the "atomic" decision processes.

Decision Roles & Responsibilities. A structure is needed for successful participative decision-making that explicitly recognizes the different reasons for participation and the different capacities in which participants can be expected to contribute. It has proven useful to distinguish five decision roles, namely: Decision Manager, Consultee, Approver, Inspector, and Informee.

The Decision Manager plays the central role that has traditionally been associated with the term "decision maker," that is, making the choice of one from among two or more possible options. However, the role also carries critical additional responsibilities. The Decision Manager must manage the decision process and take responsibility for implementation of the decision. Our paradigm of the "decision maker" has been profoundly influenced by our experience of decision-making as a solitary, rather than a group process. The term "Decision Manager" has been deliberately chosen here to help break the paradigm's hold on our thinking—to emphasize responsibility for the conduct of the decision process rather than for the mere selection of an alternative. The decision maker has usually been associated only with the latter responsibility. Our Decision Manager is responsible for both the choice and the process of choosing.

The role of a Consultee is to provide either expertise required to make a good decision or commitment of resources needed for successful implementation. A Consultee has a right to the opportunity to influence the Decision Manager's choice, not a right to veto that choice. The consultation process, which is managed by the Decision Manager, may take any of several forms at the discretion of the Decision Manager. In decision situations that require more than two or three Consultees or that are new, unclear or complex, the Decision Manager may find it appropriate to bring the Consultees together for one or more face-to-face meetings. This differs from common practice only in having more thoughtfully selected attendees, more explicit delineation and definition of attendee roles, and a more precisely focused agenda. Usually, where the number of Consultees is few, or the decision straight forward, face-to-face meetings are probably unnecessary. Instead, the Decision Manager may hold a tele-conference, or she may simply solicit participation from the Consultees individually by any means of communication available, with or without some preliminary indication of the decision result that she has in mind. The only requirement is that the Consultees feel that they have had an adequate opportunity to influence the Decision Manager's choice.

An Approver's role is to prevent organizationally intolerable outcomes that might result from a decision made without the benefit of some expertise that the Approver has, and is not otherwise available to the Decision Manager. The other reason for an Approver is to assure that the decision has not been unduly influenced by the parochial interests of the Decision Manager to the detriment of the organization. The Approver role is like the Consultee role with two important differences. The Approver has veto power (i.e., he must be satisfied with the decision result and the process) and the Approver does not participate fully in the deliberations that take place before the decision. It is desirable for the Approver to be informed about the progress and content of lengthy and complex deliberations as they go on, rather than being informed at the conclusion. However, the Approver's full participation in the pre-decision deliberations would severely undermine the role of the Decision Manager, since the Approver would essentially be taking on the role of Decision Manager. (It would be better to make the Decision Manager a Consultee and make the Approver the Decision Manager—explicitly.)

An Informee's role is to make subsequent decisions and perform subsequent tasks in a way that is consistent with the decision made. The defining characteristic of this role is that, while an Informee's participation in the deliberations leading up to the decision is not useful, his or her failure to participate in carrying out the decision may seriously undermine the implementation. Consider, for example, the payroll clerk. In most organizations it would not be useful to include the payroll clerk in decisions regarding the size of salaries and bonuses to be awarded. But failure to inform the clerk of the decision once it has been made, renders the decision moot.

The Inspector's role is to ensure that the result of a decision conforms to any published specifications. Individuals who are called "approvers" are often merely inspectors. These so-called "approvers" are checking to see that others have done what they were supposed to have done-that is, they are checking to see that the result of the decision conforms to some set of specifications. For example, a lawyer may check to see that the copyright and trademark notices have been properly displayed. A marketing manager may verify that the artist has used the correct colors. This is a different role than the one we have outlined above in that the requirements are fully established and the so-called "approver" is simply checking to see that they have been met. Unlike the Approver's role, these tasks could be delegated to any conscientious person. This is an inspector's job and we therefor call the role "Inspector."

The five decision roles and their specific responsibilities to others are set forth in Table A.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
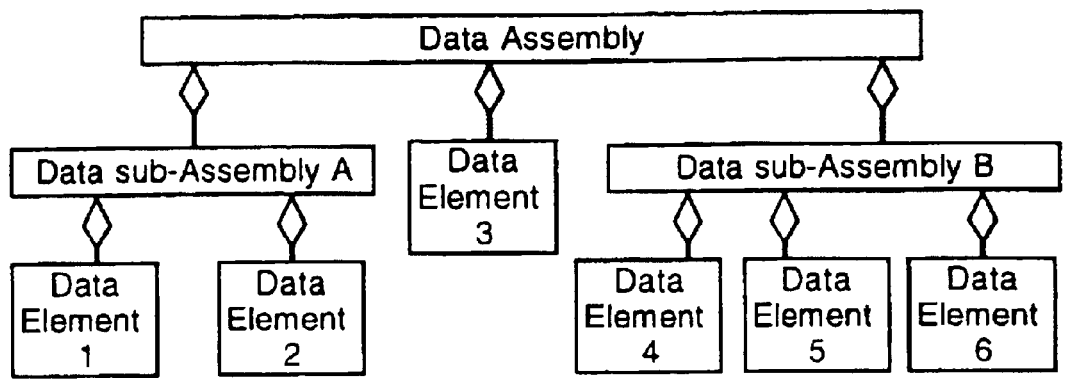
FIG. 1 is an object diagram illustrating a prototypical aggregation of data.
Figure 2:
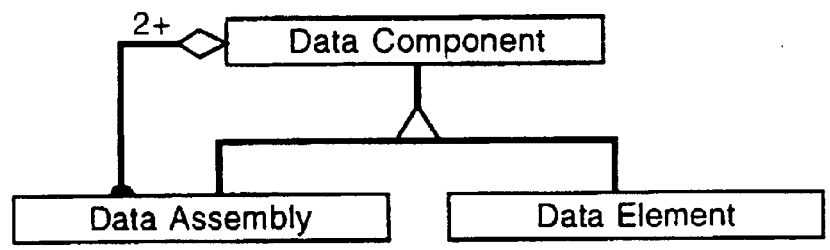
FIG. 2 is an object diagram defining the general aggregation of data.
Figure 3:
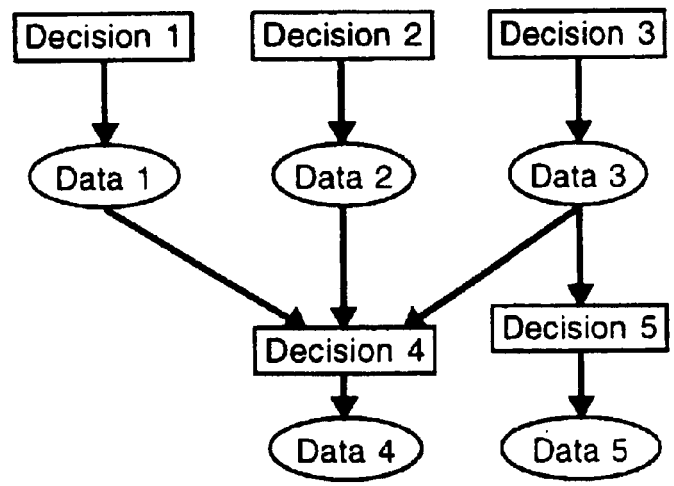
FIG. 3 is a schematic diagram illustrating the relationship of data to decisions and the linking of decisions through data.

Glossary. The discussion of the present invention utilizes certain terms in a precise sense. The following definitions of those terms are provided for clarity.

"Decision" means a decision situation in which a choice is to be made from among two or more alternatives (e.g., color?, corrosive?, price?, supplier? quantity?). The number of alternatives may be infinite or unknown.

"Data" means the result of the act of deciding (e.g., red, yes, $5.00 each, Acme, 650). A data element may be divisible into constituent data elements (e.g., cells in a matrix, items in a list, characters in a string, delimited areas of a graphic).

"Decision Role" means the set of behaviors prescribed for a participant in a decision (e.g., Decision Manager, Consultee, Approver, Inspector, Informee). There can be any number of different roles defined for participants.

"Position" means position or job in an organization, usually designated by a title (e.g., President, CEO, Quality Manager, Foreman, Chemist) and job description.

"Process" means a system that converts inputs to outputs (e.g., computer system, manufacturing system, water purification system, justice system).

"Decision Process" means a process whose inputs and outputs are data, or artifacts containing data (e.g., business planning process, product development process, sales process, customer support process), and whose principal components are decisions.

"Process Model" means a model constructed of both concrete and abstract classes and object instances of some of those classes, that specifies and defines the way in which the work of a decision process will be performed.

"Project" is an instance of a process model (e.g., this year's business plan, the development of an improved widget, getting the Acme Company order, addressing the issues at Consolidated Corp.).

Terms of Art. The invention has been developed and is presented here using the conventions and practices of Object Modeling Technique (OMT).

A class is an abstraction that describes properties important to an application and ignores the rest. . . . Each class describes a possibly infinite set of individual objects. Each object is said to be an instance of its class. (Jame Raumbaugh, Michael Blaha, William Premerlani, Frederick Eddy, and William Lorensen, *Object-Oriented Modeling and Design*, Prentice Hall: Englewood Cliffs, N.J., 1991, p. 2)

An abstract class is a class that has no direct instances but whose descendent classes have direct instances. A concrete class is a class that is instantiable; that is it can have direct instances. (ibid., p. 61)

The OMT methodology uses three kinds of models to describe a system: the object model, describing the objects in the system and their relationships; the dynamic model, describing the interactions among objects in the system; and the functional model, describing the data transformations of the system. Each model is applicable during all stages of development and acquires implementation detail as development progresses. A complete description of a system requires all three models.

The object model describes the static structure of the objects in a system and their relationships. The object model contains object diagrams. An object diagram is a graph whose nodes are object classes and whose arcs are relationships among classes.

The dynamic model describes the aspects of a system that change over time. The dynamic model is used to specify and implement the control aspects of a system. The dynamic model contains state diagrams. A state diagram is a graph whose nodes are states and whose arcs are transitions between states caused by events.

The functional model describes the data value transformations within a system. The functional model contains data flow diagrams. A data flow diagram represents a computation. A data flow diagram is a graph whose nodes are processes and whose arcs are data flows.

The three models are orthogonal parts of the description of a complete system and are cross-linked. The object model is most fundamental however, because it is necessary to describe what is changing or transforming before describing when or how it changes.

Object-oriented development places a greater emphasis on data structure and a lesser emphasis on procedure structure than traditional functional-decomposition methodologies. [It] adds [and relies on] the concept of class-dependent behavior. (ibid., pp. 6–7)

Abstract classes form the basis of a framework. If abstract classes factor out enough common behavior, other components, that is, concrete classes or other abstract classes, can be implemented based on the contracts offered by the abstract classes. A set of such abstract and concrete classes is called a framework.

The term application framework is used if this set of abstract and concrete classes comprises a generic software system for an application domain. Applications based on such an application framework are built by customizing its abstract and concrete classes. In general, a given framework anticipates much of a software systems's design. The design is reused by all software systems built with the framework. (Wolfgang Pree, *Design Patterns for Object-Oriented Software Development*, Addison-Wesley: Reading, Mass., 1995, p. 54.)

Conventions. References in the description to specific elements of figures are keyed with numerals that appear bold-faced in both the text and the figure. Numeric references to classes and their objects are numerals below 200 and are consistent across all figures. All other numeric references are specific to the particular figure. Notation used in figures is generally that of OMT (Rumbaugh, et. al., op. cit., inside front & back covers.). Class, object and state names are capitalized. Abstract class names are also italicized and underscored in figures, but not in the text. A question mark, "?", at the end of a class name is used to distinguish a concrete decision class or object name from their related concrete data class or object names.

Framework Architecture. The present invention consists of an application framework for the development of abstract, decision process models. Each such decision process model is used as a pattern to instantiate concrete project models that incorporate the work defined by the abstract process. The framework is built around a core set postulates—1) the work of the process requires the production of data or artifacts incorporating data, 2) decisions are the processes that produce data, 3) some decisions themselves require data, either as raw material which is processed or as a component of a data assembly, 4) some decisions require the participation of two or more persons in differentiated roles, 5) a process model specifies how work shall be done, 6) a project is a unit of work performed in accordance with the process, and 7) decisions that require data are logically, and therefore temporally dependent on the decisions that provide the required data.

Object Model

Figure 4:
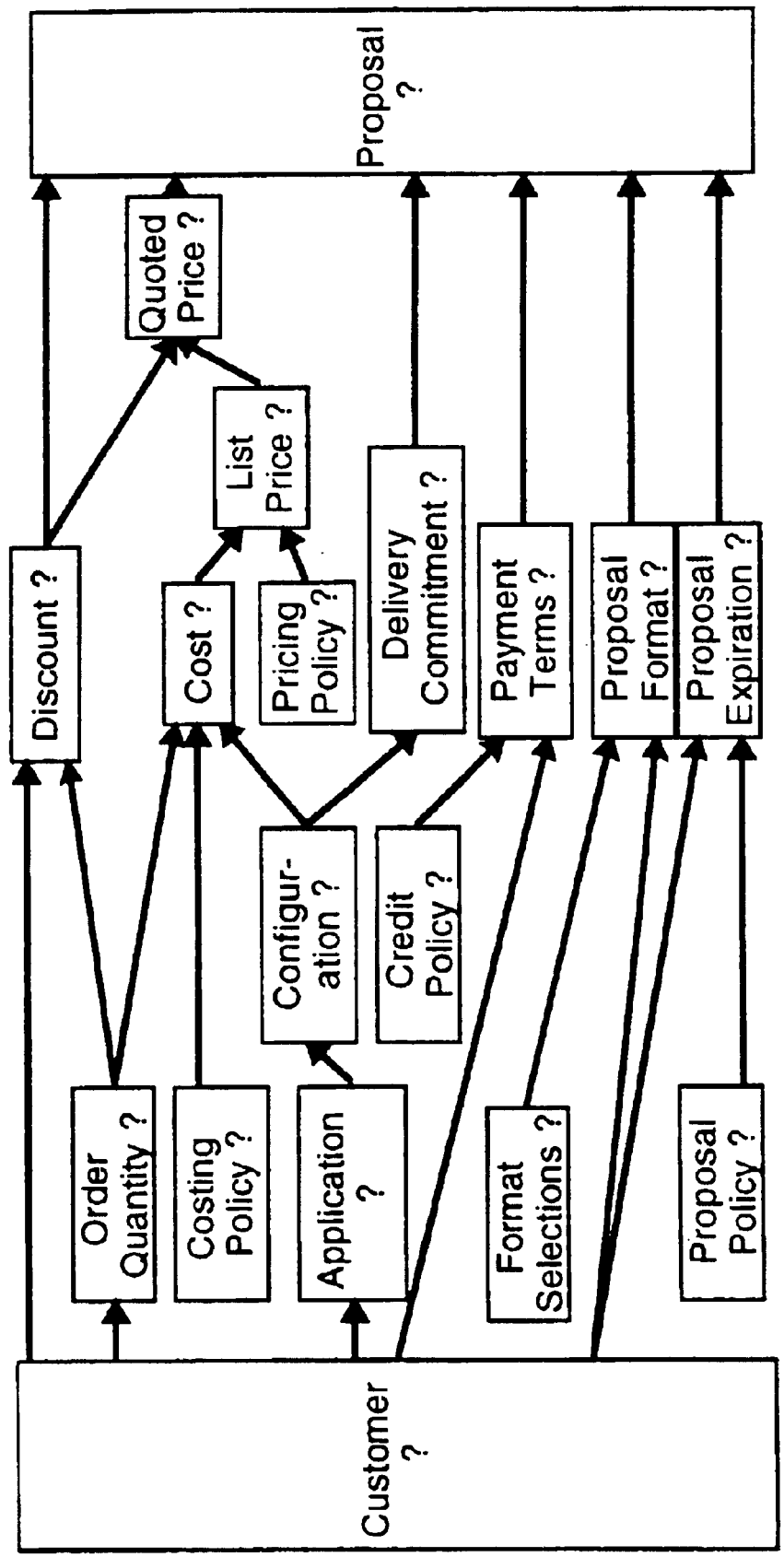
FIG. 4 is a schematic diagram illustrating the network structure of decisions in a typical decision process—in this instance a hypothetical proposal preparation process.
Figure 5:
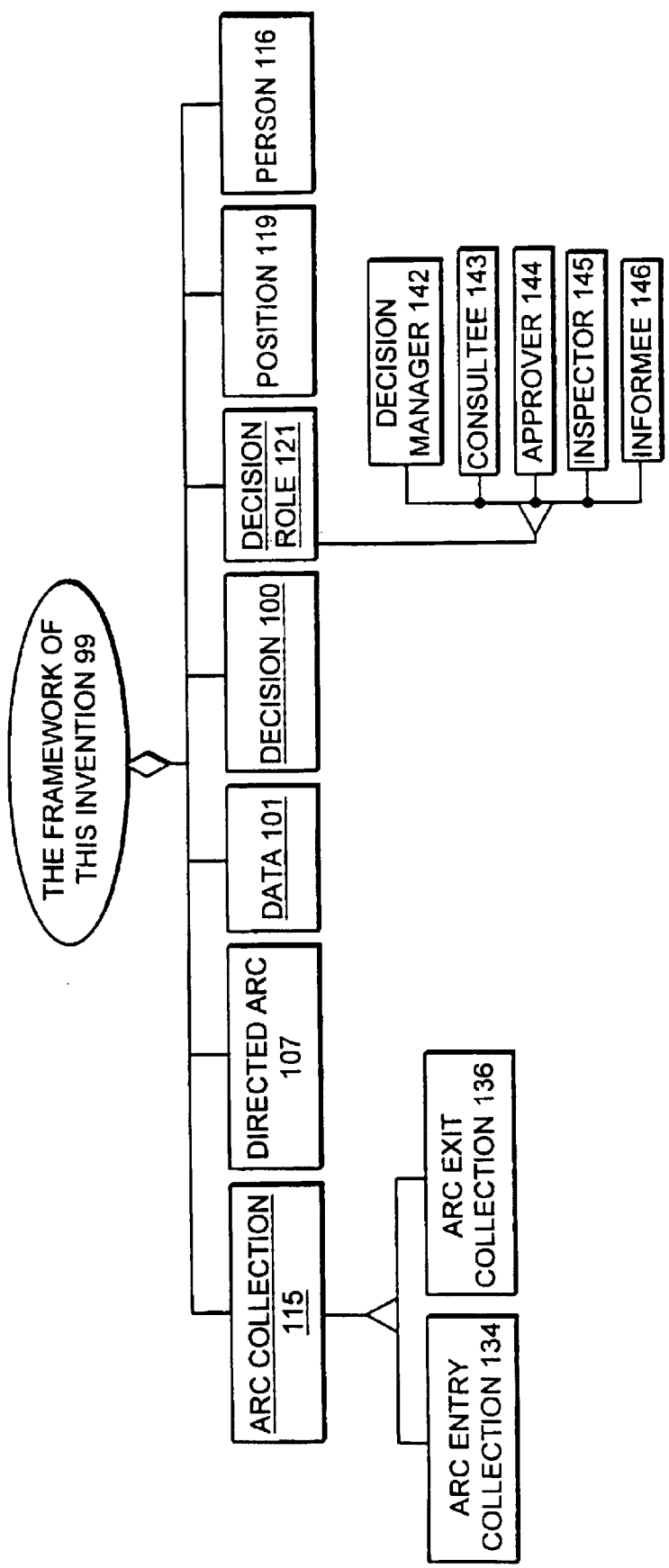
FIG. 5 is a class diagram illustrating the abstract and concrete classes comprising the application framework of the present invention.
Figure 6:
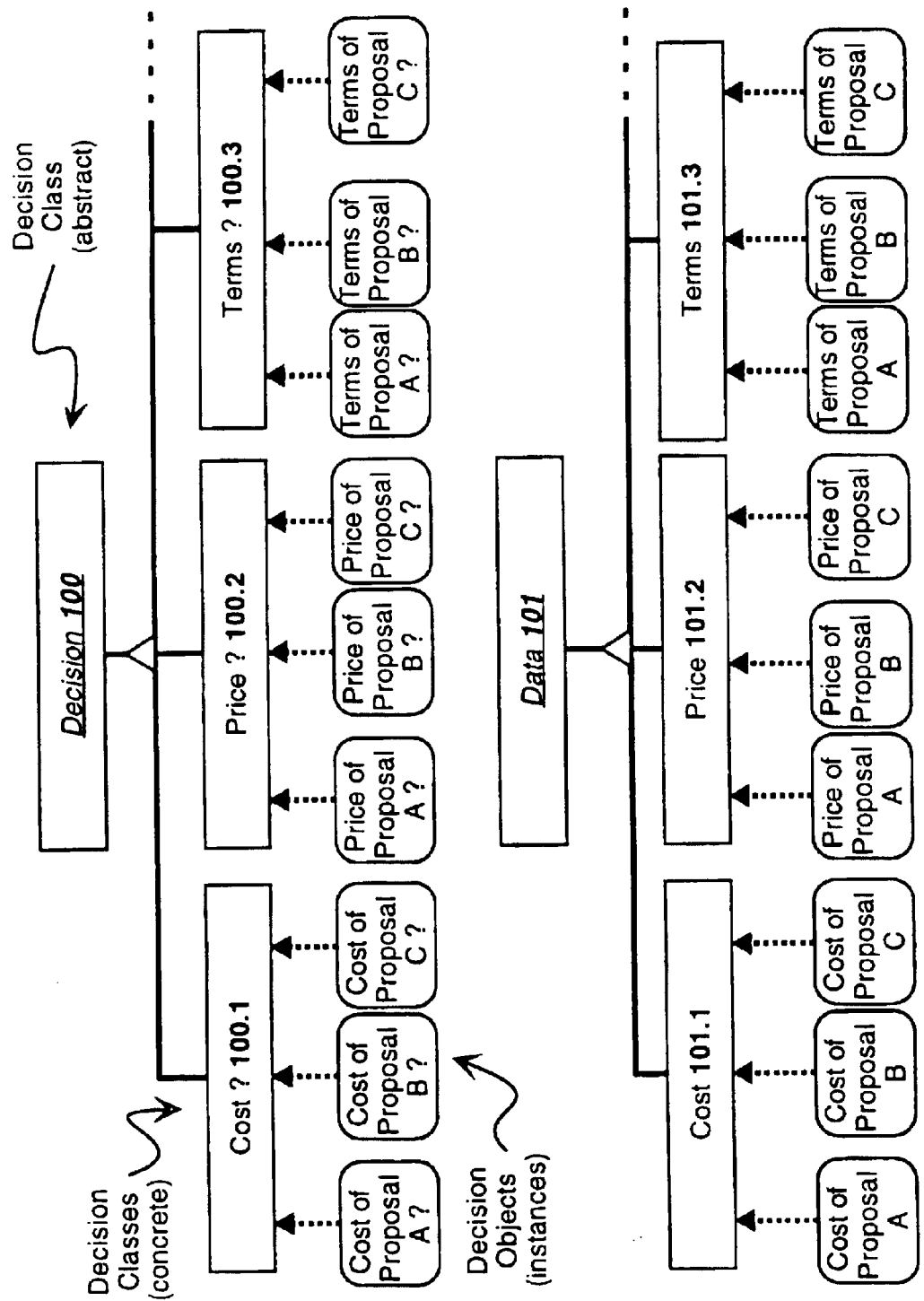
FIG. 6 is a class diagram illustrating the relationship between two of the abstract classes, Decision and Data, of the application framework and their concrete classes and object instances.

The Framework 99 is constructed from a related set of abstract and concrete object classes that are depicted in FIG. 6. The abstract Decision class 100 has members that are classes of decisions which are specific to the application domain. In the example, depicted in FIG. 4, all of the boxes representing nodes of the network would be modeled as concrete class instances of the Decision class 100. This relationship between the abstract Decision class 100 and some of its concrete classes and object instances are more clearly depicted in the upper half of FIG. 6. The Data class 101 is also an abstract class that has a one-to-one relationship with the Decision class 100. The relationship between the abstract Data class 101, its concrete classes and their object instances is shown in the lower half of FIG. 6. Referring again to FIG. 5, the other abstract classes of the Framework 99 are Arc Collection 115 and Decision Role 121. The Arc Collection class 115 has two concrete subclasses, Arc Entry Collection 134 and Arc Exit Collection 136. The instances of these classes are collections of Directed Arc 107 objects which are instances of another one of the Framework's 99 classes. These two subclasses are differentiated by the end of the Directed Arc 107 object that they use to determine their members; the former using the entry end of the Directed Arc 10 object (the end without the arrowhead in FIG. 4) and the latter using the exit end. The abstract Decision Role class 121 has five concrete classes in the preferred implementation, Decision Manager 142, Consultee 143, Approver 144, Inspector 145, and Informee 146. These five concrete, subclasses model the behaviors and responsibilities described in Table A. As indicated in FIG. 5, there will be exactly one Decision Manager 142 related to each Decision 100. There may or may not be any Position 119 designated to participate in a Decision 100 in any of the other four roles 143, 144, 145, and 146. Nor is there a limit on the number of Positions 119 that may participate 120 in any of these latter four roles. The final classes of the Framework 99 are the concrete classes Position 119 and Person 116 which model the organization and the incumbents of the organization respectively.

Figure 7:
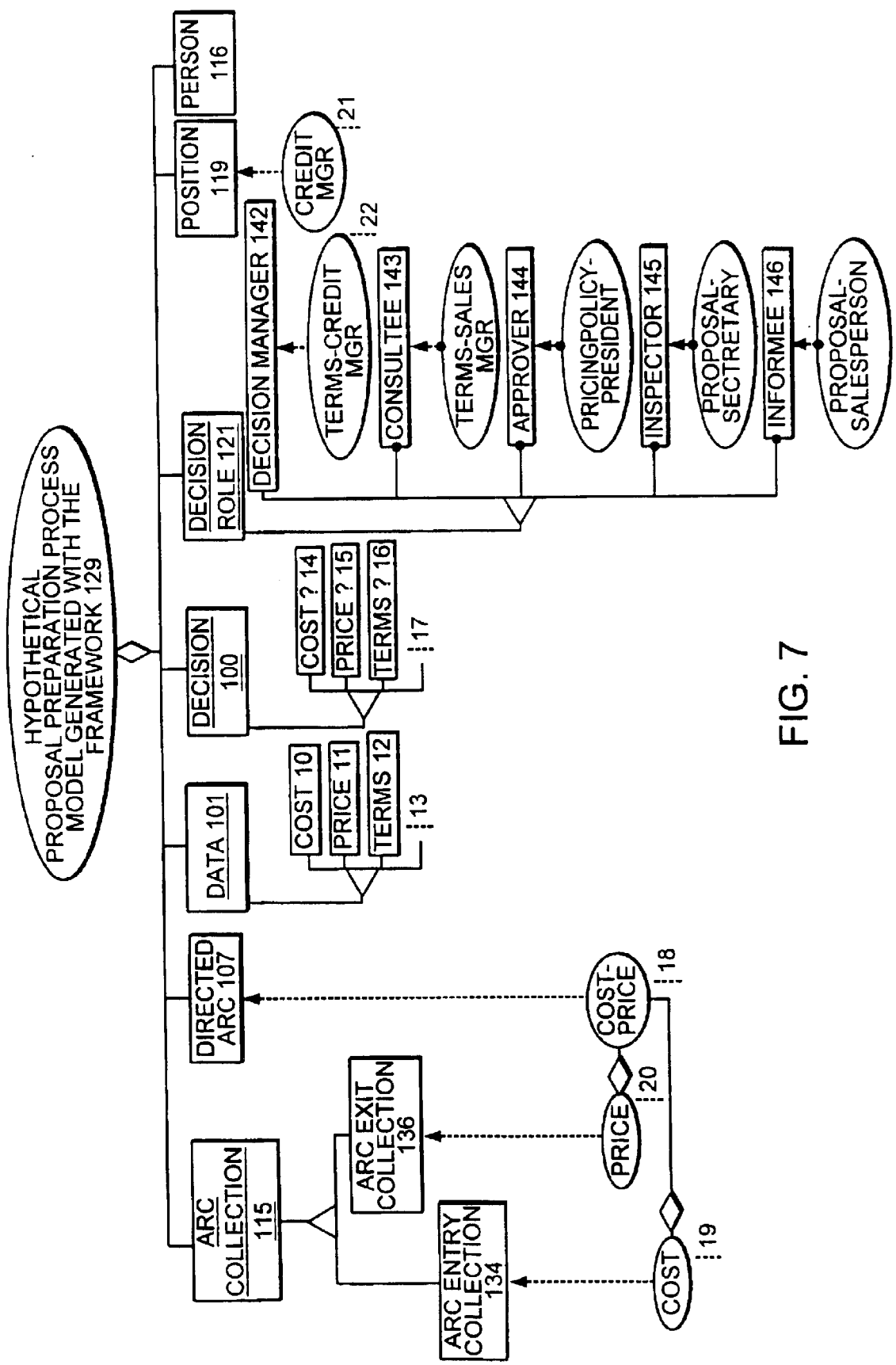
FIG. 7 is a class diagram depicting the classes and objects comprising a prototypical process model generated with the application framework of the present invention (reference made to FIG. 4).

The Framework 99 depicted in FIG. 5 has both abstract and concrete classes but no objects. Two of its classes do not have any concrete classes. FIG. 7 depicts classes and objects of a hypothetical Process Model 129 derived from the Framework and based on the example depicted in FIG. 4. In addition to the elements of the Framework depicted in FIG. 5, the Process Model 129 has concrete subclasses Cost 10, Price 11, Terms 12 etc. of the of the abstract Data class 101, and concrete subclasses Cost ? 14, Price? 15, Terms? 16 etc. of the of the abstract Decision class 100. (the short broken lines 13 and 17 indicate that there are other concrete subclasses of these two abstract classes which have been omitted for clarity.) The Framework 99 abstracts the desired behavior common to all decision processes whether they be a proposal preparation process, a product development process, or a strategic planning process. The Process Model 129 is more concrete and specific. It abstracts only those desired behaviors that are common to the particular decision process being modeled, in the example illustrated in FIG. 4, FIG. 6, and FIG. 7, the proposal preparation process of the organization or organizations that use this particular process. The process Model 129 also includes the objects which are instances of the concrete classes Directed Arc 107, Arc Entry Collection 134, Arc Exit Collection 136, Position 119, and the five concrete subclasses of the Decision Role class 121 to the extent that any are specified for this particular process.

Figure 8:
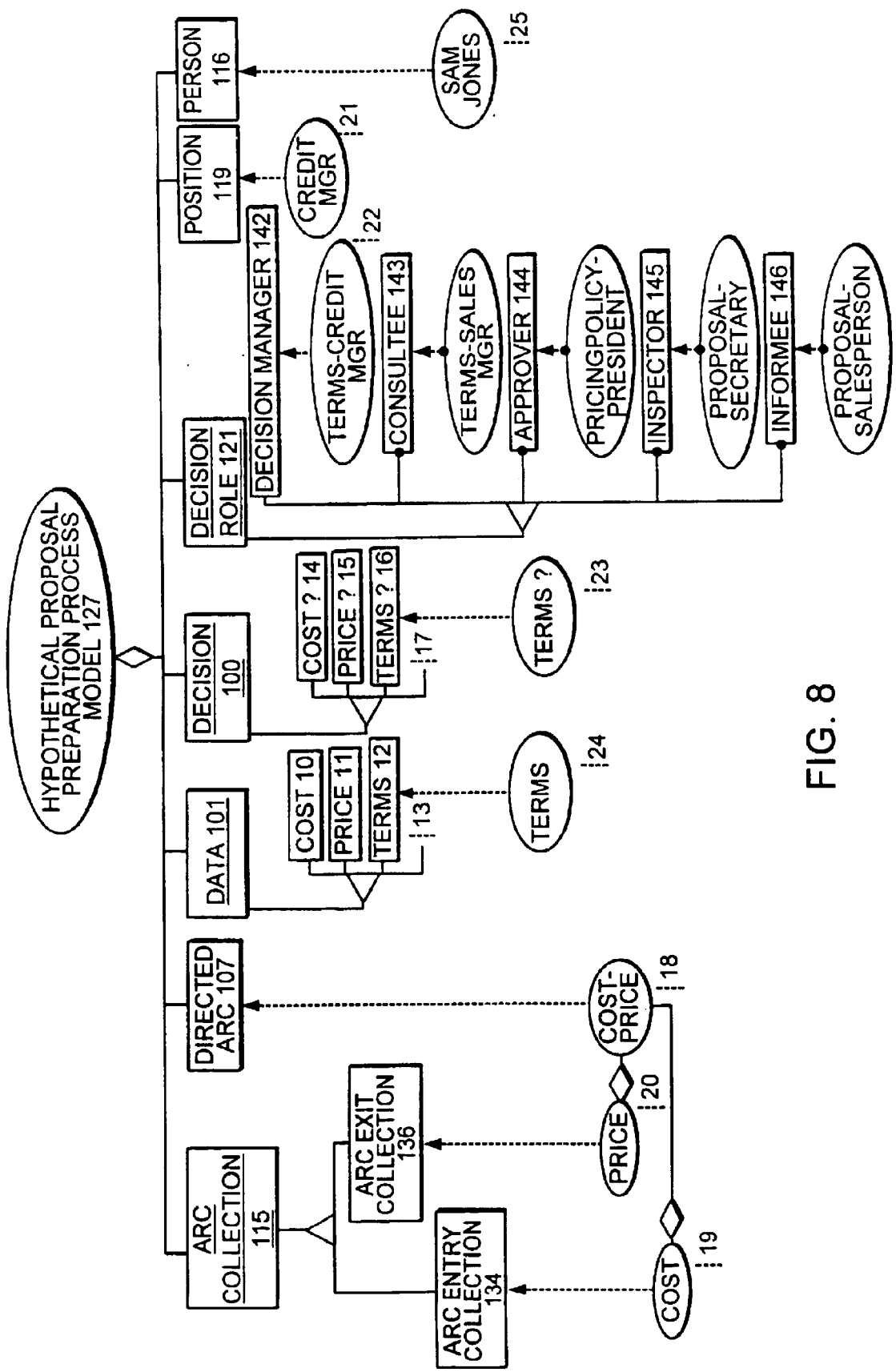
FIG. 8 is a class diagram depicting the classes and objects comprising a prototypical project model instantiated by the prototypical process model of FIG. 7.

The only potential objects that are missing from the Process Model 129 are the objects that are instances of the concrete subclasses of Decision 100 and Data 101 and the concrete class Person 116. Unlike the objects that are included in the Process Model 129, the missing objects are expected to change from project to project as the process is followed. These are the objects that belong to the Project Model 127 and are so depicted in FIG. 8 (see 23, 24 and 25).

Figure 9:
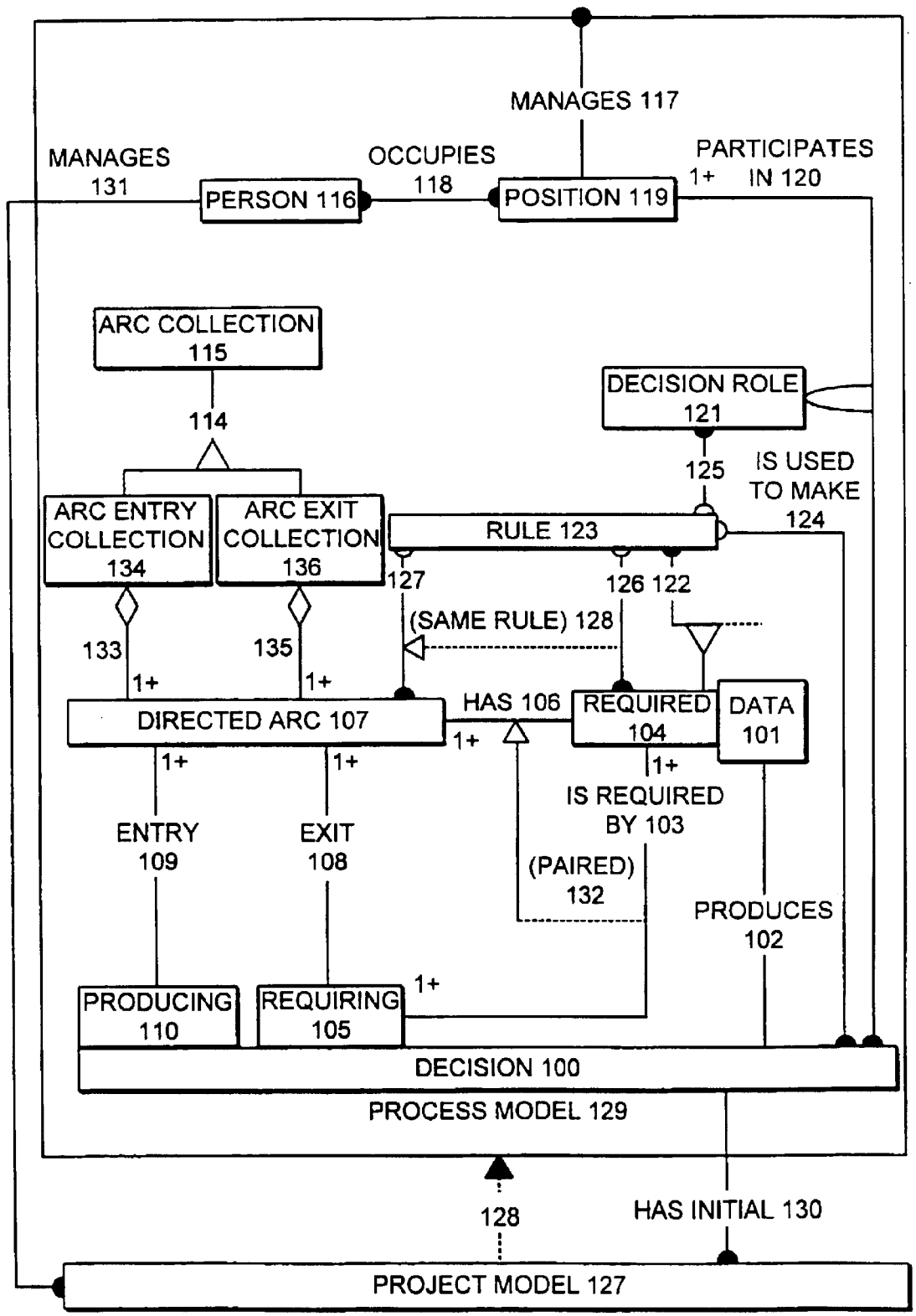
FIG. 9 is a class diagram depicting the classes of the application framework of the present invention and their relationships to one another.

FIG. 9 depicts the classes of the Framework 99 with all of their important associations, some of which were omitted from the foregoing figures and discussion. As illustrated in FIG. 9, each instance of the Decision class 100 produces 102 one, and only one, instance of the concrete subclasses of Data class 101. The instances of Data 101's concrete classes, may be of any type including two-valued boolean, simple scalars, text strings or more complex types such as matrices, graphics or documents. Data 101 is also related to Decisions 100 in another way. A Decision 100 may require 103 one or more elements of required Data 104 as input. A Decision 100 in such a relationship with required Data 104, is a requiring Decision 105. For example, the "quoted price?" Decision 100 may require 103 the required Data 104, "quantity quoted", which is produced 102 by the "quantity to quote?" Decision 100. The "quoted price?" Decision 100 might also require Data 104 from the "customer class?", "delivery requirement?", "terms quoted?", and "competitive situation?" Decisions 100.

Each element of required Data 104 has 106 one or more Directed Arcs 107 which are paired 132 one-to-one with the required by 103 relationship between each element of required Data 104 and each of the requiring Decisions 105. Each Directed Arc 107 is related at its exit 108 end to the requiring Decision 105 of the related 106 required Data 104. At its entry 109 end, each Directed Arc 107 is related to the producing Decision 110 of the required Data 104 associated 106 with the Directed Arc 107.

Requiring 105 Decisions 100 and their dependencies upon producing 110 Decisions 100 are connected by Directed Arcs 107 with an entry at the end of the arc connected to its respective producing 110 Decision 100 and an exit at the end of the arc connected to its requiring 105 Decision 100. Each Directed Arc 107 is a member 133 of one Arc Entry Collection 134 comprised of 133 all and only those Directed Arcs 107 which have the same producing Decision 110. Each Directed Arc 107 is also a member 135 of one Arc Exit Collection 136 comprised of 135 all and only those Directed Arcs 107 which have the same requiring Decision 105. Arc Entry Collections 134 and Arc Exit Collections 136 are specializations of the Arc Collection 115 class, which specialization is based on whether the class is defined by its entry 109 relationship or its exit 108 relationship.

Persons 116 occupy 118 organizational Positions 119 which participate 120 in Decisions 100 in a Decision Role 121 that defines the expected and acceptable behaviors associated with that participation 120.

A subset 122 of required Data 104 may be used as Rules 123. Such Rules 123 may be used to make 124 Decisions 100. For example, a rule for making a Decision that converts "quantity quoted" and "list price" into "price quoted" might be "IF {quantity quoted}<10, THEN {price quoted}={list price}, ELSE {price quoted}=0.9*{list price}." A Rule 123 may also be used to specify the applicability 125 of a Decision Role 121, or both 126 of an element of required Data 104 and 127 its associated 106 Directed Arc 107. Note that the Rule 123 determining the applicability of required Data 104 and the Rule 123 determining the applicability of its associated 106 Directed Arc 107 is constrained to be the same Rule 128 because required Data 104 and its associated 106 Directed Arc 107 must be either both applicable, or both inapplicable. Note also, that a Rule 123 may be used to specify the applicability 126 of another Rule 123, since that other Rule 123 is also an element of required Data 104. Examples of these uses of rules to govern applicability are:

(1) Decision Role 121 applicability 125: "IF {product category]={lawn care}, THEN {Decision Manager}= {Product Manager, Lawn Care}, ELSE IF {product category}={snow blowers}, THEN {Decision Manager}= {Product Manager, Snow Handling}, ELSE {Decision Manager}={Marketing Manager};"

(2) Directed Arc 107 and required Data 104 applicability 126 and 127, where required data does not operate as a rule: "IF {product's 'kill claims' }={none}, THEN {registration number} NOT REQUIRED by {label layout} AND Arc:{registration number } to {label layout} NOT APPLICABLE, ELSE; {registration number} REQUIRED by {label layout} AND Arc: {registration number} to {label layout} APPLICABLE;

(3) Directed Arc 107 and required Data 104 applicability 126 and 127, where required data does operate as a rule: "IF {product status}={established}, THEN use {quantity discount rule}, ELSE, use {null rule }."

All of the foregoing object classes other than Project 127 aggregate to Process 129, which is managed 117 by a Person 116 occupying 118 a Position 119 which has been designated the "Process Manager." Alternatively, a Person 116 could be directly designated to manage 117 a Process 129 without an intervening Position 119. A Project 127 is instantiated 128 based on the pattern provided by the Process Model 129 and a related initial 130 Decision 100. The Project 127 network consists of an instance of the initial 130 Decision 100, together with an instance of each of the decisions in the Process 129 that require 103, directly or indirectly, the data 104 produced by 102 the initial 130 Decision, and an instance of all the Directed Arcs 107 connecting the initial 130 Decision 100 and the directly and indirectly requiring 105 Decisions 100. A Project 127 is managed 131 by a Person 116 designated the "Project Manager". Alternatively, a Person 116 could be designated to manage 131 a Project 127 via an intervening Position 119, as is indicated for management 117 of Process 129.

Dynamic Model

Figure 10:
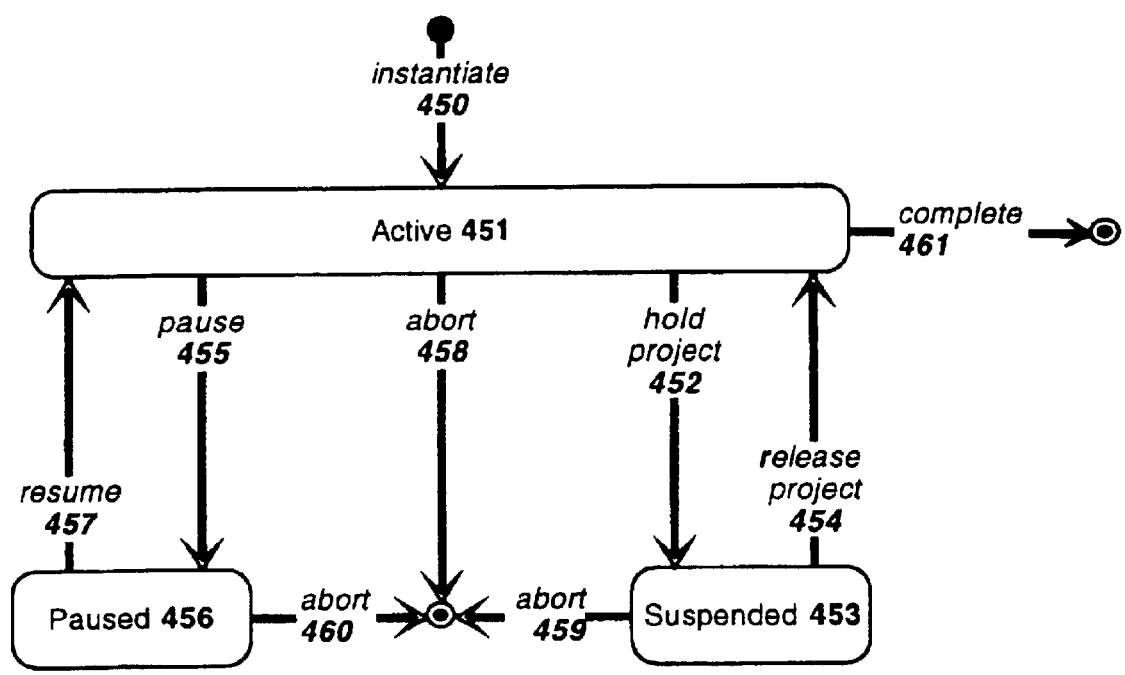
FIG. 10 is state diagram depicting the aspects of the Project object that change over time.

Dynamic Behavior of Project 127 Object. The dynamic behavior of the Project 127 object is depicted in FIG. 10. The Project 127 object is instantiated in Active 451 state. If a project is put on hold the Project 127 object transits 452 to Suspended 453 state. Upon release from project hold the Project 127 object transits back to Active 451 state. If the project receives a pause 455 the Project 127 object transits 455 to Paused 456 state. Upon resume 457 the Project 127 object returns 457 to Active 451 state. If the project is aborted from any of its three states the Project 127 object transits 458, 459, or 460 out of existence.

Figure 11:
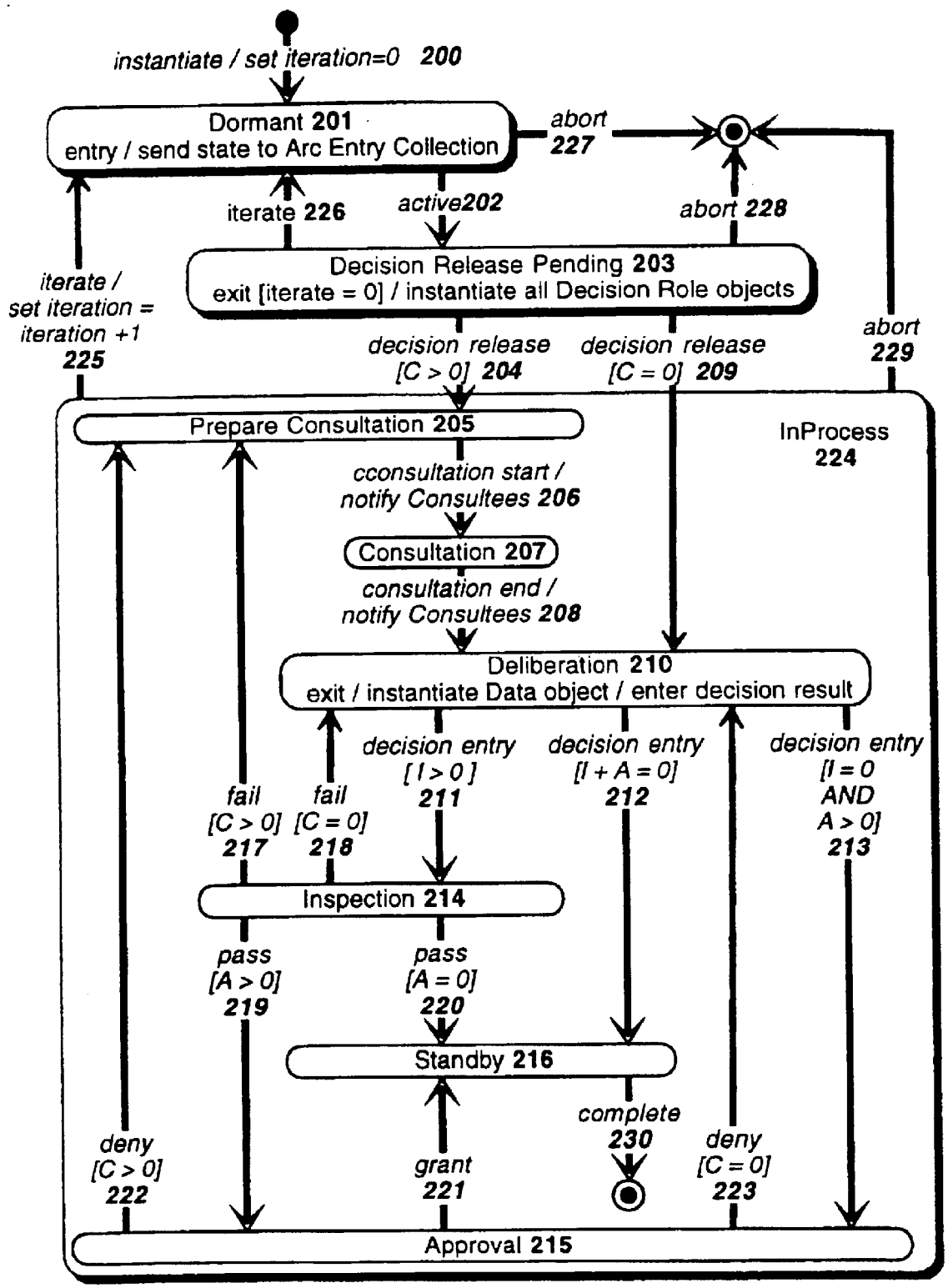
FIG. 11 is state diagram depicting the aspects of the Decision object that change over time.

Dynamic Behavior of Decision 100 Object. The objects of the domain-specific, concrete classes generated from the abstract Decision 100 class are the central controlling actors of the "atomic", intra-decision process. Referring to FIG. 11, upon its instantiation 200 as a component of the a Project 127, a Decision 100 object is in Dormant 201 state. It remains in Dormant 201 state until activated by the Arc Exit Collection 136 related to it. When so activated, a Decision 100 object transits 202 to Decision Release Pending 203 state. From Decision Release Pending 203 state, a Decision 100 object transits 204 to Prepare Consultation 205 state upon "release" if the number of Consultees 143 designated for the Decision 100 object is greater than zero. If the number of Consultees 143 is zero, it transits to Deliberation 210 state, upon release. "Release" is the default value of a Decision 100 object's Release/Hold attribute. It can be toggled between "release" and "hold" by any authorized individual (most appropriately, the Project Manager) at any time that the Decision 100 object is in Decision Release Pending 203 or Dormant 201 states. If the Release attribute is toggled to "release" while the Decision 100 object is in Decision Release Pending 203 state, the object immediately transits 204 or 209 to either Prepare Consultation 205 state or Deliberation 210 state depending upon whether it does or does not have Consultees 143 designated. Upon exiting Decision Release Pending 203 for the first time, a Decision 100 object causes the instantiation of all its designated Decision Role 121 objects.

When in Prepare Consultation 205 state and the Decision Manager 142 is prepared to begin consultation with the designated Consultees 143, the Decision Manager 142 initiates the Decision 100 object's transit 206 to Consultation 207 state. Transit 206 causes notification to be sent to all designated Consultees 143, that Consultation 207 on this Decision 100 object has begun. When the Decision Manager 142 determines that the requirements for consultation have been satisfied, the Decision 100 object transits 208 to Deliberation 210 state, causing notification of all Consultees 143. When the Decision Manager 142 enters the decision result, the Decision 100 object either transits 211 to Inspection 214 state, or transits 213 to Approval 215 state, or transits 212 to Standby 216 state, depending on whether the Decision 100 object has at least one Inspector 145 designated, or no Inspectors 145, but at least one Approver 144, or neither Inspectors 145 nor Approvers 144, respectively. From the Inspection 214 state, the Decision 100 object either transits 219 to Approval 215 state, or transits 220 to Standby 216 state when the result of inspection is "pass" and the Decision 100 object has, respectively, at least one Approver 144 or no Approvers 144 designated. When the result of the inspection is "fail," the Decision 100 object in Inspection 214 state either transits 217 to Prepare Consultation 205 state or transits 218 to Deliberation 210 state, depending on whether the Decision 100 object does or does not have any Consultees 143 designated. When a Decision 100 object is in Approval 215 state and the result is "deny," it either transits 222 to Prepare Consultation 205 state or transits 223 to Deliberation 210 state, depending upon whether the Decision 100 object does or does not have any Consultees 143 designated. If the result in Approval 215 state is "grant," the Decision 100 object transits 221 to Standby 216 state. Upon completion of a Project 127, all of the Project's Decision 100 objects will be in Standby 216 state and will transit 230 out of existence.

The states Prepare Consultation 205, Consultation 207, Deliberation 210, Inspection 214, Standby 216, and Approval 215 of a Decision 100 object aggregate to state InProcess 224. While a Decision 100 object is in InProcess 224 state, it may become necessary to reconsider, and therefore to iterate the Decision 100 object's decision process from its initial state. Therefore, such iteration causes a Decision 100 object in InProcess 224 state to transit 225 to Dormant 201 state, or if in Decision Release Pending 203 state, to transit 226 to Dormant 201 state. If the Project 127 of which the Decision 100 object is a part, is aborted while in any state, the Decision 100 object transits 227, 228, or 229 to out of existence.

Figure 12:
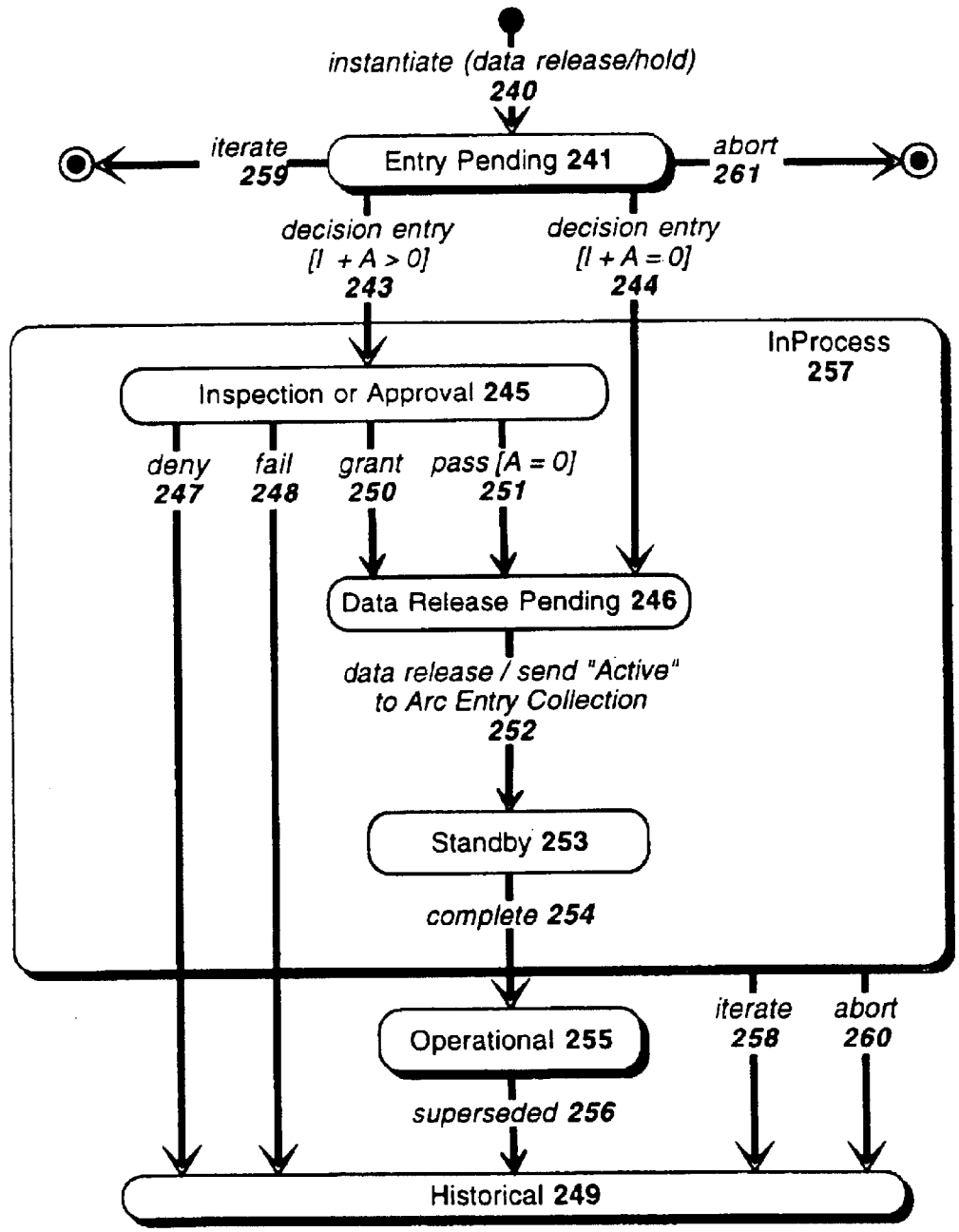
FIG. 12 is state diagram depicting the aspects of the Data object that change over time.

Dynamic Behavior of Data 101 Object. Each Decision 100 object is associated one-to-one with the Data 101 object it produces 102. The dynamic behavior of Data 101 objects is depicted in FIG. 12. A Data 101 object is instantiated 240 in state Entry Pending 241 when the Decision Manager 142 of its producing 110 Decision 100 is ready to enter the decision result. Upon completion of the decision entry, the Data 101 object transits 243 to Inspection or Approval 245 state if there is at least one Inspector 145 or one Approver 144 designated for the Decision 100. Otherwise, upon decision entry the Data 101 object in Entry Pending 241 state transits 244 to Data Release Pending 246 state. When inspection results have been entered by all Inspectors 145 designated for Decision 100, the inspection results are evaluated. If any such result indicates "fail," the Data 101 object's state transits 248 to Historical 249 state. If all inspections result in "pass," and there are no Approvers 144 designated for the Decision 100, the Data 101 object's state transits 251 to Data Release Pending 246 state. When there is at least one Approver 144 designated for said Decision 100, the approval review results are evaluated. If all required approvals are "granted," the Data 101 object's state transits 250 to Data Release Pending 246 state. If any approval is "denied", the Data 101 object's state transits 247 to Historical 249 state.

When a Data 101 object's "hold/release" attribute is set to "release" and it is in Data Release Pending 246 state, the Data 101 object transits 252 to Standby 253 state and sends "active" to its Arc Entry Collection 134. The "hold/release" attribute can be used to selectively retard a project's progress by toggling it to "hold" on selected Data 101 objects. When every Decision 100 object belonging to a Project 127 has an instantiated Data 101 object which is in state Standby 253, the Project 127 is complete and all Data 101 objects transit 254 to Operational 255 state. When Data 101 objects in Operational 255 state are superseded by a Data 101 object from a subsequent Project 127, the former Data 101 object transits 256 to Historical 249 state. The states Inspection or Approval 245, Data Release Pending 246, and Standby 253 aggregate to state InProcess 257.

If a Project 127 iterates across Decision 100 objects with related Data 101 objects that are in InProcess 257 state, such Data 101 objects transit 260 to Historical 249 state. If a Project 127 iterates across Decision 100 objects with related Data 101 objects in Entry Pending 241 state, those Data 101 objects transit 261 out of existence.

If a Project 127 is aborted with Data 101 objects in InProcess 257 state, such Data 101 objects transit 258 to Historical 249 state. If a Project 127 aborts with Data 101 objects in Entry Pending 241 state, those Data 101 objects transit 259 out of existence.

Figure 13:
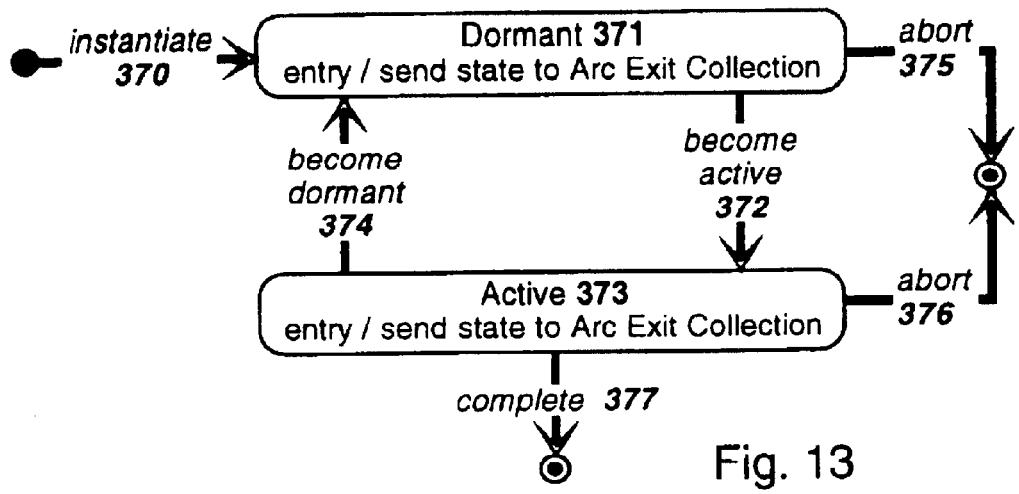
FIG. 13 is state diagram depicting the aspects of the Directed Arc object that change over time.

Dynamic Behavior of Directed Arc 107 Object. The objects of the Directed Arc 107 class, are the central controlling actors of the "molecular", inter-decision process. FIG. 13 depicts the dynamic behavior of Directed Arc 107 objects. Upon instantiation 370, each Directed Arc 107 object enters Dormant 371 state, notifying its related 135 Arc Exit Collection 136 of its state. When notified by its Arc Entry Collection 134 object that said collection has become active, a Directed Arc 107 object transits 372 to Active 373 state and, upon entering that state, notifies its related 135 Arc Exit Collection 136 of its new state. If, while in Active 373 state, the related Project 127 iterates over the related Decision 100 object, the Directed Arc 107 object transits 374 to Dormant 371 state, and upon entering that state, notifies its related 135 Arc Exit Collection 136 object of its new state. If the Project 127 to which a Directed Arc 107 object belongs aborts, the Directed Arc 107 object transits 375 or 376 out of existence from either Dormant 371 or Active 373 state respectively.

Figure 14:
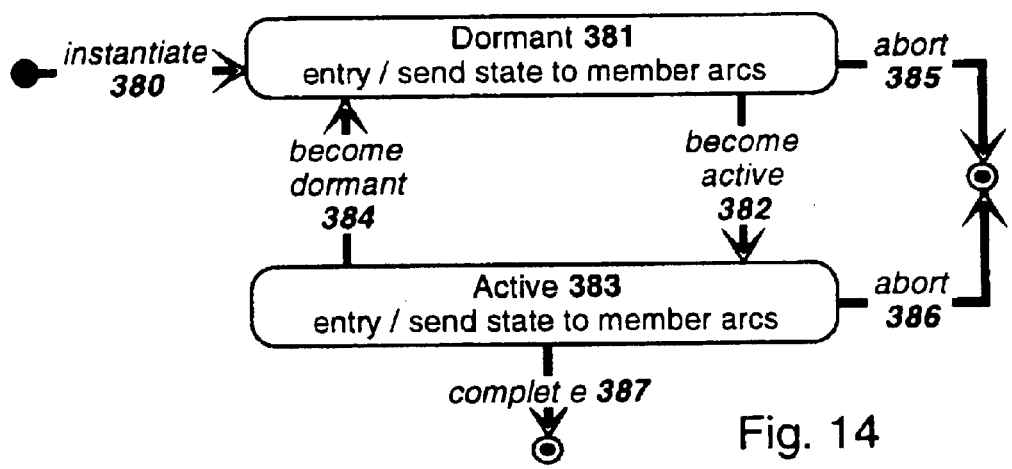
FIG. 14 is state diagram depicting the aspects of the Arc Entry Collection object that change over time.

Dynamic Behavior of Arc Entry Collection 134 Object. The dynamic behavior of the Arc Entry Collection 134 objects is depicted in FIG. 14. Upon instantiation 380 an Arc Entry Collection 134 object enters Dormant 381 state and sends a message to its member 133 Directed Arc 107 objects containing its state. When notified by the Data 101 object produced by 102 the Decision 100 associated with its entry 109, that data release 252 has occurred, the Arc Entry Collection 134 object transits 382 to Active 383 state and sends it's new state to its member 133 Directed Arcs 107. If, while in Active 383 state, the related Project 127 iterates over the related Decision 100 object, the Arc Entry Collection 134 object transits 384 to Dormant 381 state, and upon entering that state, sends it's new state to its member 133 Directed Arcs 107. If the Project 127 to which a member 133 Directed Arc 107 object belongs aborts, the Arc Entry Collection 134 object transits 385 or 386 out of existence from either Dormant 381 or Active 383 state respectively.

Figure 15:
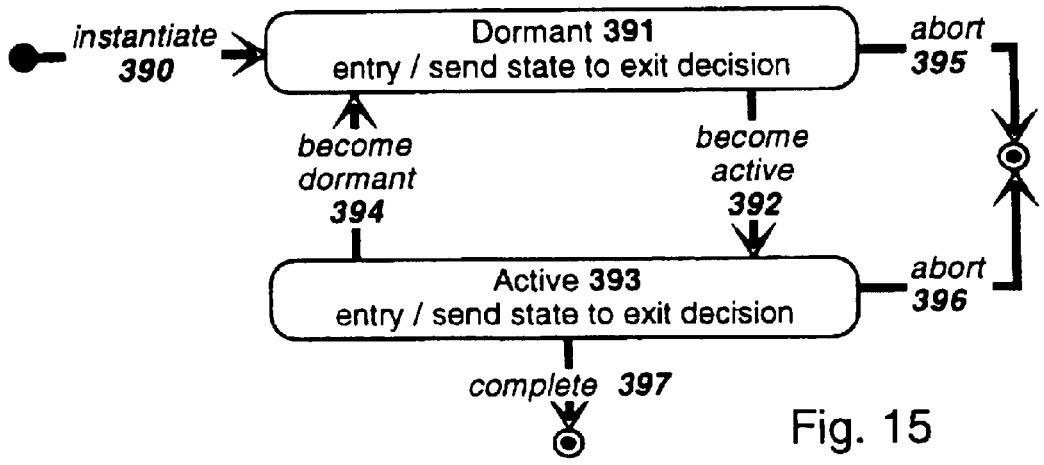
FIG. 15 is state diagram depicting the aspects of the Arc Exit Collection object that change over time.

Dynamic Behavior of Arc Exit Collection 136 Object. The dynamic behavior of the Arc Exit Collection 136 objects is depicted in FIG. 15. Upon instantiation 390 an Arc Exit Collection 136 object enters Dormant 391 state and sends a message containing its state to the requiring 105 Decision 100 object associated with its member 135 Directed Arc 107 object's exit 108. When all of its member 135 Directed Arcs 107 are in Active 373 state, the Arc Exit Collection 136 object transits 392 to Active 393 state and sends it's new state to the requiring 105 Decision 100 object associated with its member 135 Directed Arc 107 object's exit 108. If, while in Active 393 state, the related Project 127 iterates over the related Decision 100 object, the Arc Exit Collection 136 object transits 394 to Dormant 391 state, and upon entering that state, sends it's new state to the requiring 105 Decision 100 object associated with its member 135 Directed Arc 107 object's exit 108. If the Project 127 to which a member 135 Directed Arc 107 object belongs aborts, the Arc Exit Collection 136 object transits 395 or 396 out of existence from either Dormant 391 or Active 393 state respectively.

Figure 16:
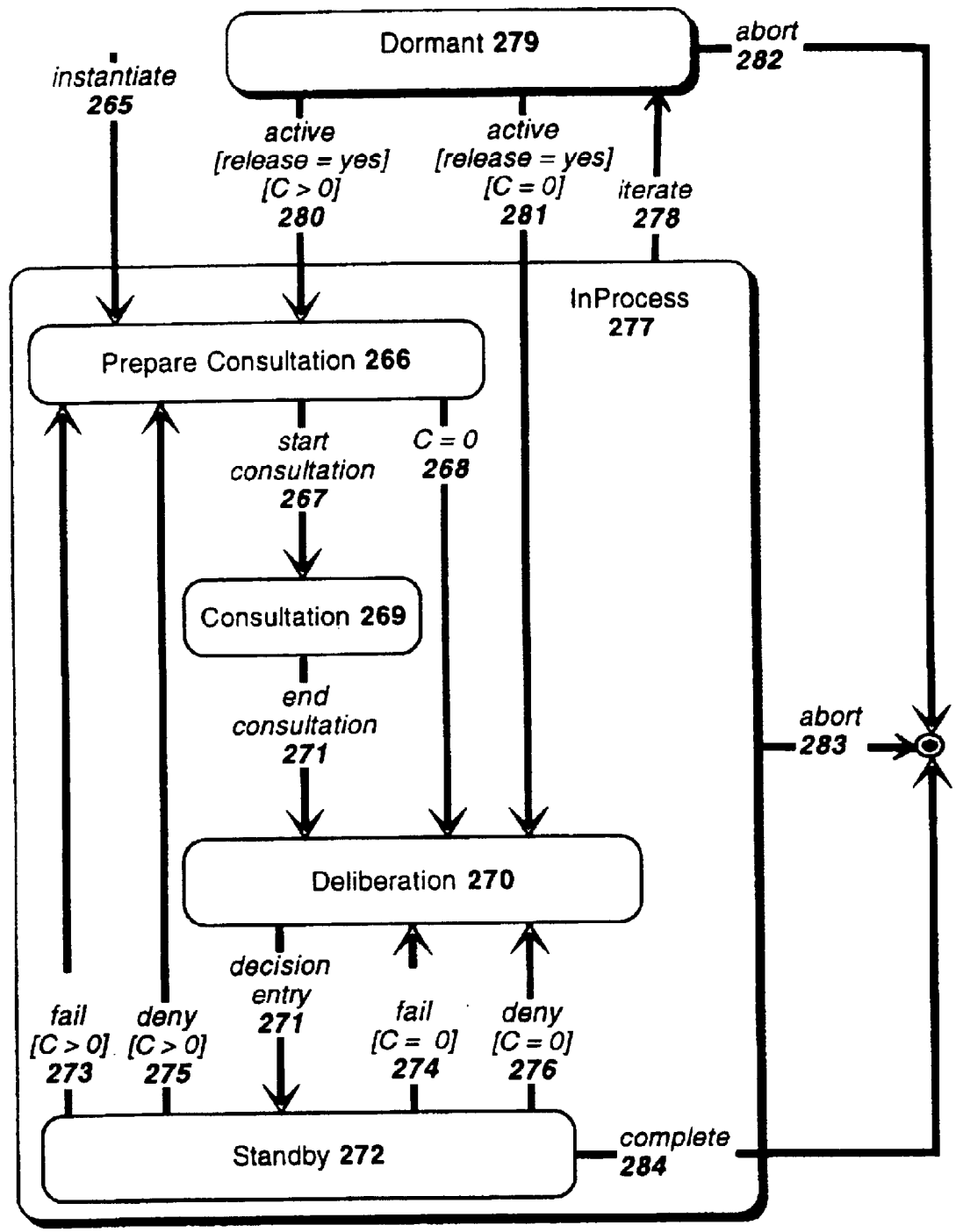
FIG. 16 is state diagram depicting the aspects of the Decision Manager object that change over time.

Dynamic Behavior of Decision Manager 142 Decision Role 121 Object. As depicted in FIG. 16, the Decision Manager 142 object is instantiated 265 in the Prepare Consultation 266 state. If there are no Consultees 143 designated for the related Decision 100 object the Decision Manager 142 object immediately transits 268 to Deliberation 270 state. Otherwise, the Decision Manager 142 object transits 267 to Consultation 269 when the incumbent in the Decision Manager role indicates the beginning of consultation. The Decision Manager 142 object transits 271 to Deliberation 270 when the incumbent in the Decision Manager role indicates the end of consultation. The Decision Manager 142 object transits 271 from Deliberation 270 to Standby 272 state when the Decision Manager incumbent enters the decision result. From Standby 272 state the Decision Manager 142 object either transits 273 or transits 274 upon inspection fail to either Prepare Consultation 266 state or Deliberation 270 state depending, respectively or whether the Decision 100 object does or does not have any Consultees 143 designated. Upon approval deny the Decision Manager 142 object either transits 275 or transits 276 from Standby 272 state to either Prepare Consultation 266 state or Deliberation 270 state depending, respectively or whether the Decision 100 object does or does not have any Consultees 143 designated. States Prepare Consultation 266, Consultation 269, Deliberation 270, and Standby 272 aggregate to state InProcess 277. If the Decision 100 object to which the Decision Manager 142 object is related iterates, the Decision Manager 142 object transits 278 from state InProcess 277 to state Dormant 279. If the Project 127 object of which the Decision Manager 142 object is a component aborts, the Decision Manager 142 object either transits 283 from state InProcess 277 out of existence or transits 282 from state Dormant 279 out of existence. Upon Project 127 completion the Decision Manager 142 object either transits 284 out of existence.

Figure 17:
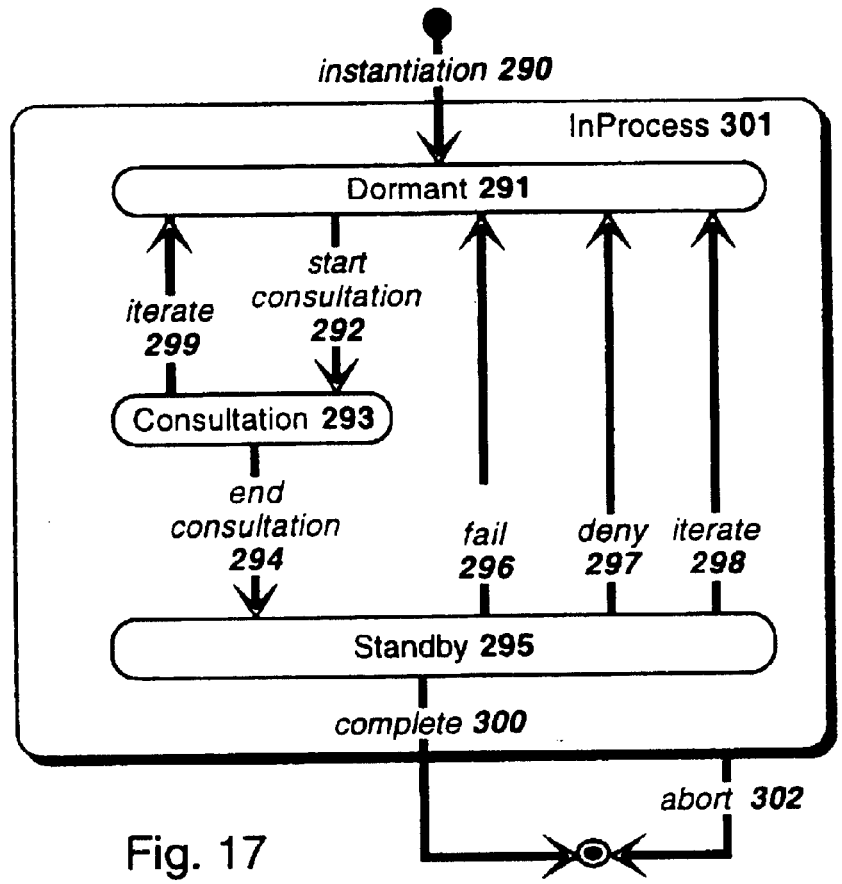
FIG. 17 is state diagram depicting the aspects of the Consultee object that change over time.

Dynamic Behavior of Consultee 143 Decision Role 121 Object. As depicted in FIG. 17 the Consultee 143 object is instantiated 290 in Dormant 291 state. Upon the start of consultation it transits 292 to Consultation 293 state. When end consultation occurs the Consultee 143 object transits 294 to Standby 295 state. If any related inspection fails, or approval is denied, or the related Decision 100 object is iterated, the Consultee 143 object returns 296, 297, or 298 respectively to Dormant 291 state. The three states of the Consultee 143 object aggregate to InProcess 301 state. If the Project 127 object of which the Consultee 143 object is a component, aborts, the Consultee 143 object transits 302 out of existence. Upon completion of the project, the Consultee 143 object transits 300 out of existence.

Figure 18:
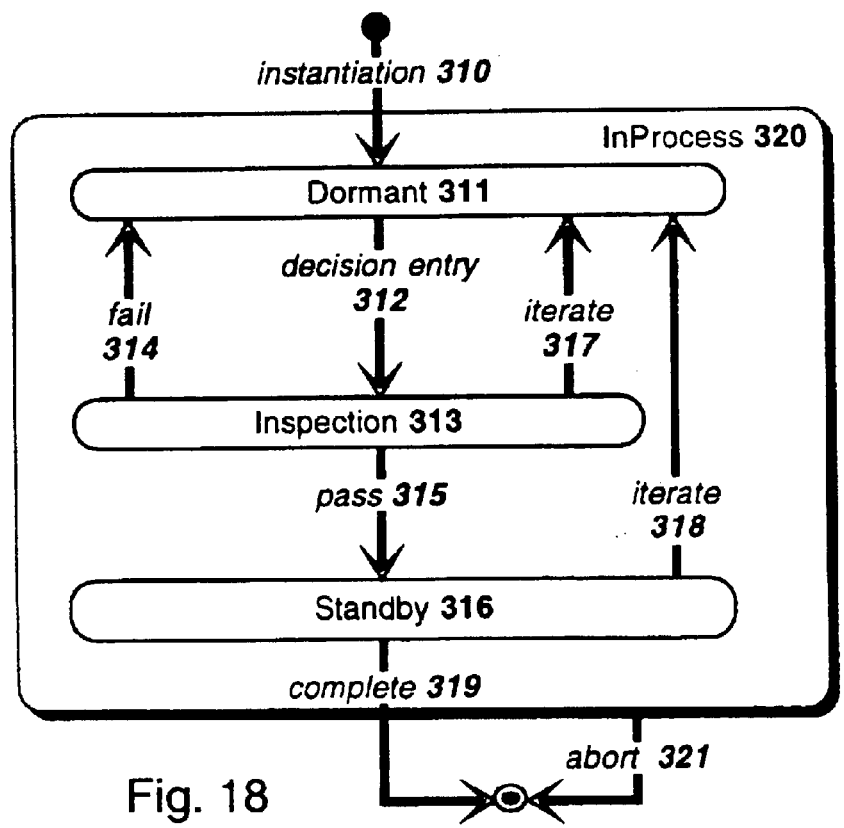
FIG. 18 is state diagram depicting the aspects of the Inspector object that change over time.

Dynamic Behavior of Inspector 145 Decision Role 121 Object. As depicted in FIG. 18 the Inspector 145 object is instantiated 310 in Dormant 311 state. Upon decision entry it transits 312 to Inspection 313 state. If all inspections pass the Inspector 145 object transits 315 to Standby 316 state. If any inspection fails,or the related Decision 100 object is iterated, the Inspector 145 object returns 314 or 317 respectively to Dormant 311 state. If the related Decision 100 iterates while the Inspector 145 object is in Standby 316 state, the Inspector 145 object transits 318 to Dormant 311 state. The three states of the Inspector 145 object aggregate to InProcess 320 state. If the Project 127 object of which the Inspector 145 object is a component, aborts, the Inspector 145 object transits 321 out of existence. Upon completion of the project, the Inspector 145 object transits 319 out of existence.

Figure 19:
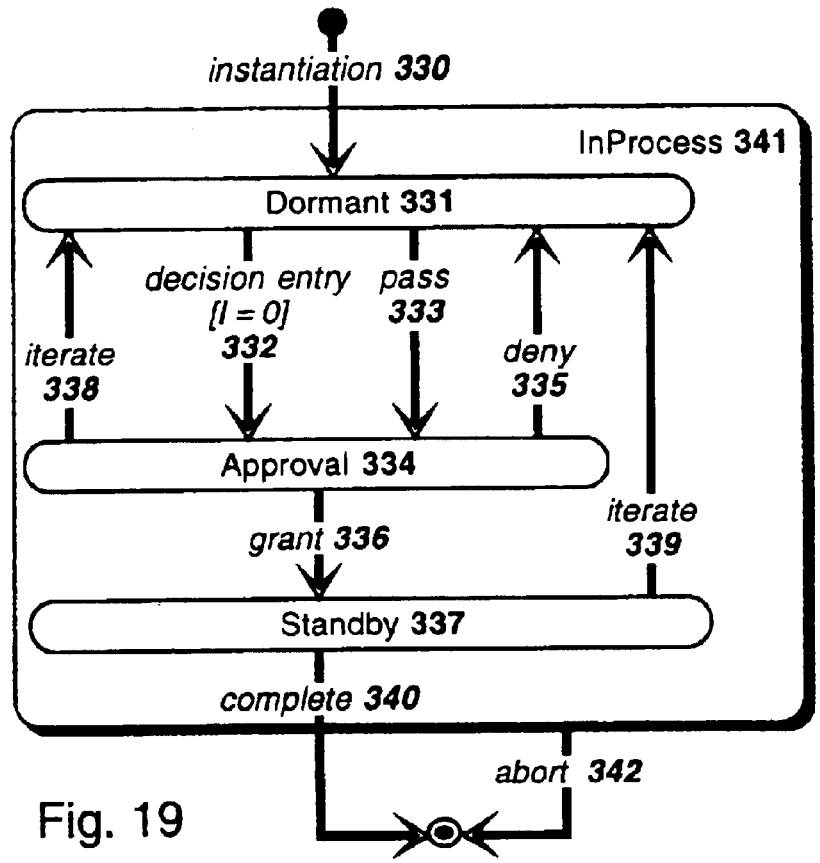
FIG. 19 is state diagram depicting the aspects of the Approver object that change over time.

Dynamic Behavior of Approver 144 Decision Role 121 Object. As depicted in FIG. 19 the Approver 144 object is instantiated 330 in Dormant 331 state. Upon decision entry it transits 332 to Approval 334 state, provided that there are no Inspector 145 objects related to this Decision 100 object. If there are Inspector 145 objects related to this Decision 100, the Approver 144 object transits 333 to Approval 334 state upon all inspections being passed. If all approvals are granted the Approver 144 object transits 336 to Standby 337 state. If any approval is denied, or the related Decision 100 object is iterated, the Approver 144 object returns 335 or 338 respectively to Dormant 331 state. If the related Decision 100 iterates while the Approver 144 object is in Standby 337 state, the Approver 144 object transits 339 to Dormant 311 state. The three states of the Approver 144 object aggregate to InProcess 341 state. If the Project 127 object of which the Approver 144 object is a component, aborts, the Approver 144 object transits 342 out of existence. Upon completion of the project, the Approver 144 object transits 340 out of existence.

Figure 20:
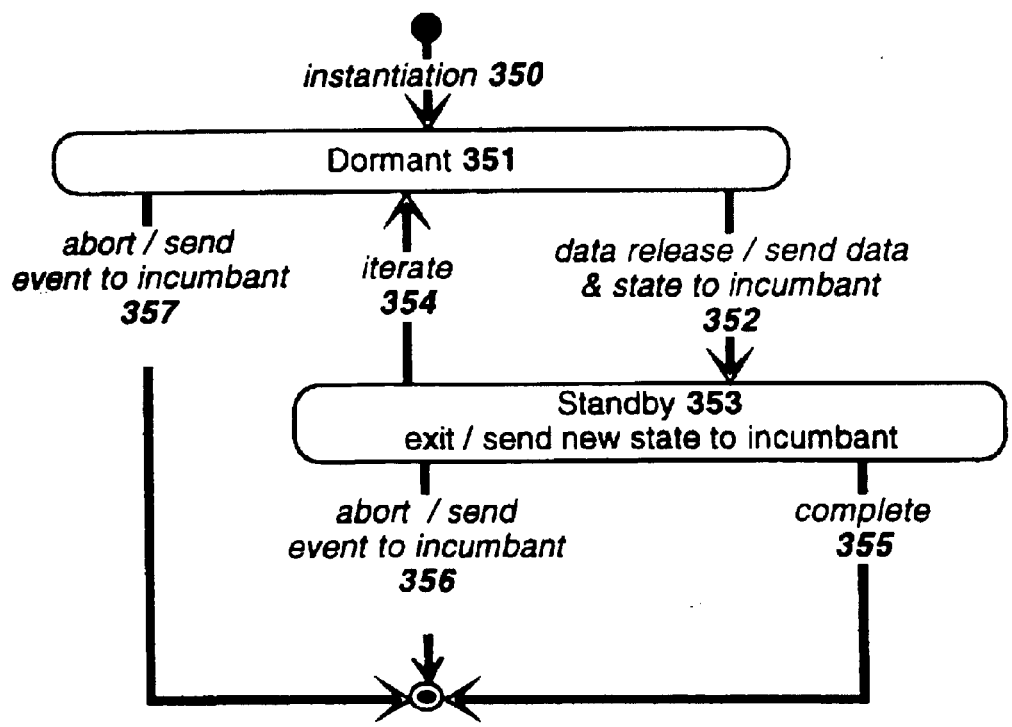
FIG. 20 is state diagram depicting the aspects of the Informee object that change over time.

Dynamic Behavior of Informee 146 Decision Role 121 Object. Although Informees are required to act on the information they receive, they are often playing some other Decision Role 121 in a subsequent Decisions 100 which require 103 the Data 104 of the producing 110 Decision 100 and are therefore Informees 146 of producing 103 Decision 100 they do not need to be modeled as Informees 146 because the inter-decision model structure handles their notification. If, however, an Informee's 146 need is associated with a Decision 100 that is beyond the model scope (i.e., is either unknown to the subject model or is undefined), messages (e.g., E-mail, office mail) must be sent to the Informee's 146 address of record. That is the function of the Informee 146 object. FIG. 20 depicts the dynamic behavior of the Informee 146 object. Upon instantiation 350 the object enters Dormant 351 state. Upon data release the Informee object 146 transits 352 to Standby 353 state and sends a message to the role incumbent containing the Data 101 and the state (i.e., released but not yet operational). If the Project 127 iterates across the Decision 100 while an Informee 146 object of that Decision 100 is in Standby 353 state, the Informee 146 object transits 354 to Dormant 351 state and sends a message to the Informee 146 role incumbent indicating the change to Dormant 351 state. If the Project 127 aborts while an Informee 146 object of a Decision 100 is in Standby 353 state or Dormant 351 state, the Informee 146 object transits 356 or 357 respectively out of existence and sends a message to the Informee 146 role incumbent indicating the change. If the Project 127 completes while an Informee 146 object of a Decision 100 is in Standby 353 state, the Informee 146 object transits 355 out of existence and sends a message to the Informee 146 role incumbent indicating the change.

Table B indicates the concurrent states of the principal objects of the model (State="None" before instantiation and after destruction of an object. State="Dormant" after instantiation but before first use of an object. State="Standby" pending possible need to iterate project prior to completion.). The vertical dimension is time, but is not to scale. Therefore the length of overlap is not significant. For example, the Directed Arc with an exit related to the decision will be active before the Decision can transit from "Dormant" to "Decision Release Pending" as indicated by the overlap of the Directed Arc's Active area and the Decision's Dormant area. However, the time of that overlap may be extremely short for some decisions and relatively long for others. States may be skipped or iterated (see the State Diagrams). Any horizontal line will cross possible concurrent states. Where a horizontal line can be drawn from a state on one object to multiple states of another object (e.g., Active state of Directed Arc (entry) to Dormant and Decision Release Pending states of Decision) all of the combinations are possible.

Functional Model

Figure 21:
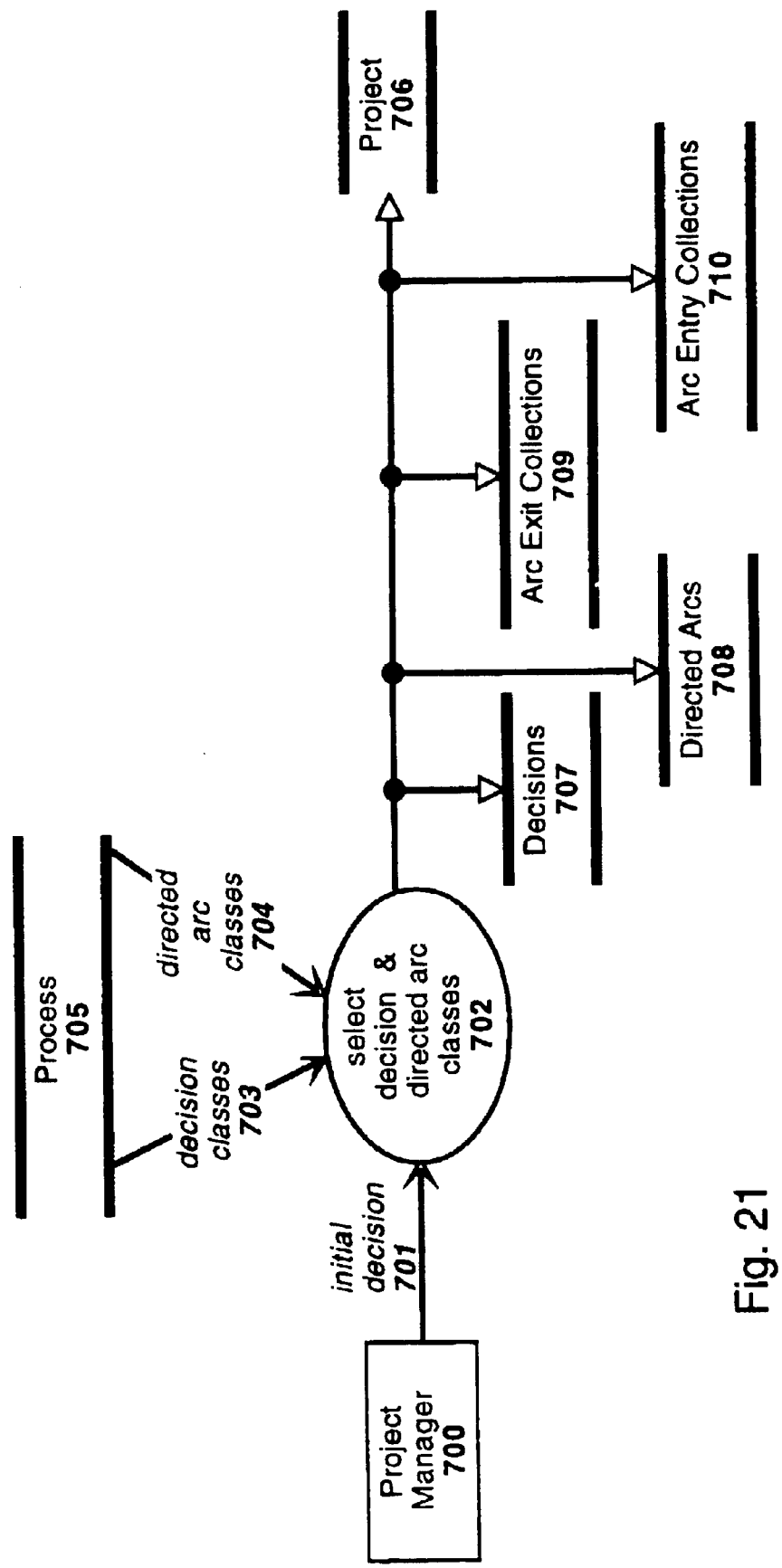
FIG. 21 is a data flow diagram depicting the data flow and value transformations required to instantiate a Project object and the Decision, Directed Arc and Arc Collection objects of the Project.

Project Instantiation. When a Project 127 is instantiated 128, other objects are also instantiated as follows. Referring to FIG. 21, the Project Manager 700 identifies the concrete sub-class of the abstract Decision 100 class from which the initial decision 701 is to be instantiated. The initial decision 701 class is used to select 702 the required decision classes 703 and directed arc classes 704 from the Process 705 object. The selected classes are used to instantiate a Project 706 object and then to instantiate, as components of the Project 706 object, an instance of the identified Decision 100 sub-class together with an instance of every Decision 707 and Directed Arc 708 that is directly or indirectly dependent on the initial decision 701. Instances of all the required Arc Exit Collection 709 objects and Arc Entry Collection 710 objects are also created within the Project 706 object.

Figure 22:
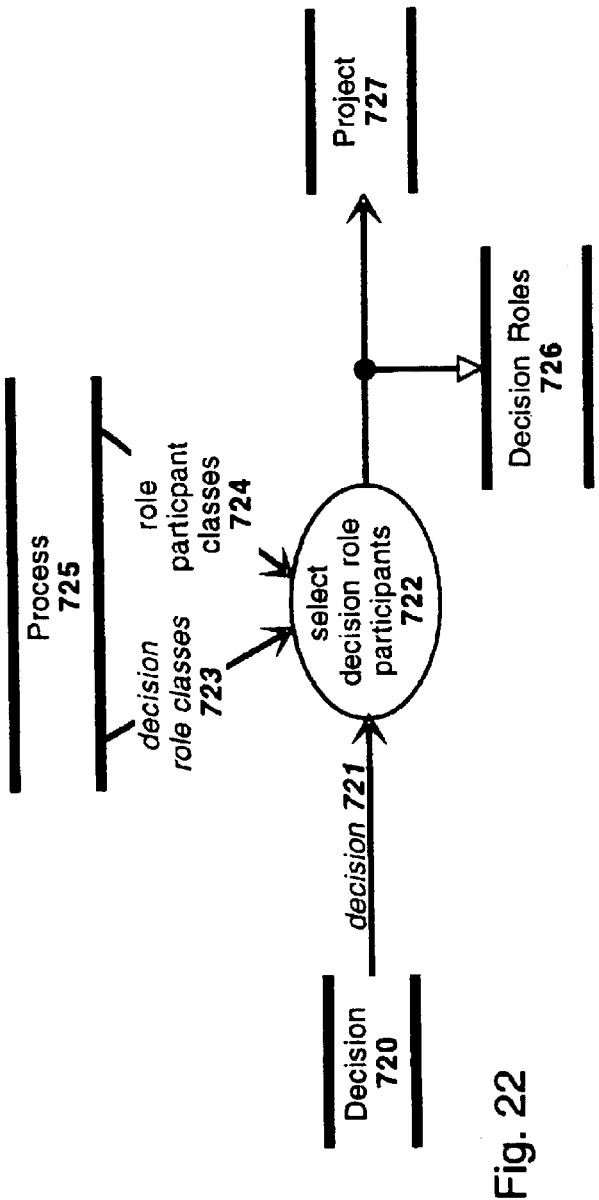
FIG. 22 is a data flow diagram depicting the data flow and value transformations required to instantiate Decision Role objects.

Decision Role Instantiation. As depicted in FIG. 22, a Decision 720 object uses its decision 721 identification to select 722 the required decision role classes 723 and positions 724 from the Process 725 object. These are used to create an instance of each required Decision Role 726 participant as components of the Project 727 object.

Figure 23:
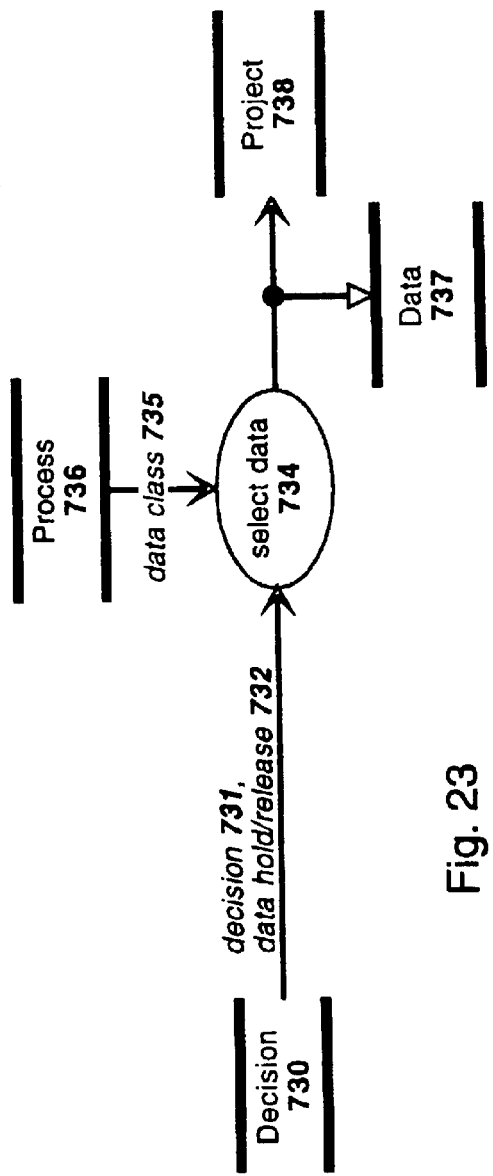
FIG. 23 is a data flow diagram depicting the data flow and value transformations required to instantiate Data objects.

Data Instantiation. FIG. 23 depicts the instantiation of Data objects. A Decision 730 object provides its decision 731 identification which are used to select 734 the appropriate data class 735 from the Process 736 object. The Decision 730 object also furnishes the value of its data hold/release 732 attribute which is used to instantiate the Data 737 object with the hold/release value and state, as a component of the Project 738 object.

Figure 24:
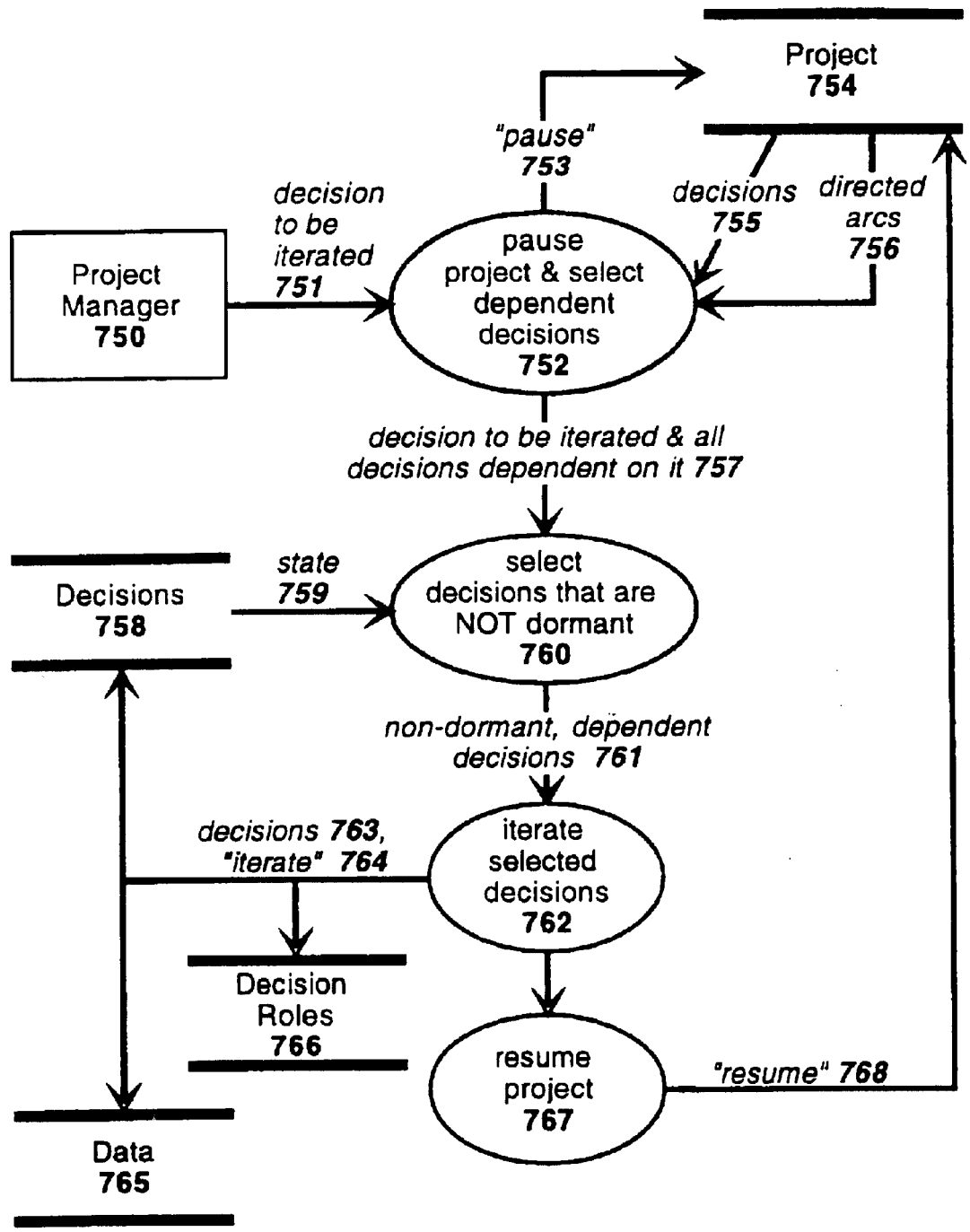
FIG. 24 is a data flow diagram depicting the data flow and value transformations required to iterate a Project object.

Project Iteration. During the course of a project, it may become necessary to revisit a decision that has already has already been made, inspected, approved and its released for use in other project decisions. Any decision instance that is in a non-dormant state is a potential candidate for iteration. When a decision is iterated the result may change and therefore, all decisions that use that result must also be iterated. Hence, decision iteration usually entails iteration of that portion of the project that is both active and "downstream" from the decision to be iterated. FIG. 24 depicts the functional model of project iteration. The Project Manager 750 identifies the decision to be iterated 751. The fist step 752 is to send a "pause" 753 message to the Project 754 object. Then The decisions 755 and directed arcs 756 are retrieved from the Project 754 object and those that are dependent on the decision to be iterated are selected. The state 759 of each of the previously selected decisions is retrieved from the Decision 758 objects and those which are in non-dormant state selected 760. The identification of the selected decisions 763 together with the "iterate" 764 message is sent to the Decision 758, Data 765 and Decision Role 766 objects. Finally, the project is resumed 767 by sending a "resume" 768 message to the Project 754 object.

While the present invention has been described with reference to a few specific embodiments, the description is illustrative of the invention and is not to be construed as limiting the invention. Various modifications may occur to those skilled in the art without departing from the spirit and scope of the invention as defined in the appended claims. For example, it would be natural to make the "data hold/release" toggle an attribute of the Data 101 object. However, the preferred embodiment defers the instantiation of Data 101 objects until they are required for entry of the Decision 100 result. It is desirable to be able to specify a hold on the release of the decision result at the time the Project 127 object is created. There are a variety of ways that this might be accomplished. The Data 101 object could be instantiated at Project 127 inception or all "data hold/release" attributes might be placed in an object instantiated for this purpose at Project 127 inception and pass them to Data 101 objects when the latter are instantiated. The preferred embodiment is to carry the "data hold" attribute value in the Decision 100 object, which is instantiated at Project 127 inception and pass it to the Data 101 object as the latter is instantiated.

A further example is the time chosen to instantiate the Inspector 145 and Approver 144 objects. Our preferred implementation instantiates them at the same time as the other Decision Role 121 objects on the expectation that there will be relatively few of them and that the model of their classes and relationships in the Process 129 model will be relatively stable. They could be implemented with a later instantiation, which would be preferred under circumstances other than those anticipated.

Nor are all the features of the implementation described here essential to the novelty or usefulness of the invention. For example, the ability to place holds selectively on the release of either decisions or their results is a feature that will probably be valued but need not be a part of the implementation. Similarly, the distinction made between the Inspector 145 and Approver 144 roles adds utility, but is not essential to the invention. These details of implementation are presented for their illustrative value and may be altered to accommodate the particular trade-offs of a specific application situation. They do not have any bearing on the scope or novelty of the present invention.

TABLE A

DECISION ROLES AND RESPONSIBILITIES

| ROLE NAME | ROLE | RESPONSIBLE TO . . . | RESPONSIBLE FOR . . . |
|---|---|---|---|
| Decision Manager | Manage the decision process, make the decision and take responsibility for its implementation | The Organization | Providing a timely, efficient and effective decision-making and implementation process. |
| | | Consultees | Providing an opportunity to influence the decision before it is made. |
| | | Approvers | Submitting the decision for approval after it has been made, but before any commitment is made to implementation. |
| | | Informees | Providing timely notification of the decision made, after it has been made. |
| Consultee | Provide expertise required to make a good decision or the commitment of resources needed for its successful implementation. (Cannot veto.) | The Organization | Contributing expertise and resources which will improve the decision of its implementation. |
| | | Decision Manager | Adhering to the decision process, providing Decision Manager with relevant expertise, taking responsibility for influencing and accepting the result when the opportunity to influence has been provided. |
| Approver | Prevent organizationally intolerable outcomes that might result from a decision made without the benefit of expertise which is not otherwise available to the Decision Manager, and assure that the decision has not been unduly influenced by the parochial interests of the Decision Manager to the detriment of the organization. (Can veto.) | The Organization | Assuring that the Decision Manager has not made a decision that favors parochial interests at the expense of the organization's welfare or that will expose the organization to unacceptable risk. |
| | | Decision Manager | Making the requirements for decision approval as clear and as specific as possible, before the decision process begins, and providing timely notification of approval or disapproval with the reasons for such disapproval. |
| Inspector | Ensure that the result of the decision conforms to the established specifications for the decision result. (Can reject.) | The Organization Decision Manager | Assuring that the decision result conforms to all established specifications. Assuring that the Decision Manager is aware of the result specifications before the decision is made and informing the Decision Manager of the inspection results (including the reasons for any failure to pass inspection) as soon as possible after the decision has been made. |
| Informee | Make subsequent decisions and perform subsequent tasks in a manner that is consistent with it. | The Organization | Making all subsequent decisions and performing all subsequent tasks in a manner that is consistent with the decision made. |

TABLE B

Object Concurrency

| Object | Project | Directed Arc (Exit) | Decision | Decision Manager | Consultee | Data | Inspector | Approver | Informee | Directed Arc (Entry) |
|---|---|---|---|---|---|---|---|---|---|---|
| State | | | | | | | | | | |
| | Active Paused or Suspended | Dormant Active | Dormant Decision Release Pending | | | | | | | Dormant |
| | | | Prepare Consultation | Prepare Consultation | Dormant | | Dormant | Dormant | Dormant | |
| | | | Consultation | Consultation | Consultation | | | | | |
| | | | Deliberation Inspection Approval Standby | Deliberation Standby | Standby | Entry Pending Inspection or Approval Data | Inspection Standby | Approval Standby | | |

TABLE B-continued

Object Concurrency

| Object | Project | Directed Arc (Exit) | Decision | Decision Manager | Consultee | Data | Inspector | Approver | Informee | Directed Arc (Entry) |
|---|---|---|---|---|---|---|---|---|---|---|
| | | | | | | Release Pending Standby Operational Historical | | | Standby | Active |

What is claimed is:

1. A computer implemented method for modeling work processes comprising:
  generating a plurality of concrete classes by customizing one or more abstract classes, and including either:
    (1) at least a concrete decision class that models both a decision situation and data produced by said decision situation, and
    requiring, for a first concrete decision class, that a second concrete decision class be a prerequisite to activation or completion of said first concrete decision class, if and only if the data modeled by said second concrete decision class is required by the decision modeled by said first decision class, or alternatively;
    at least a concrete decision class that models a decision situation and a concrete data class,
  relating each concrete decision class to one or more data classes, which concrete data classes model data produced by a decision situation modeled by said each concrete data class, and
  requiring, for at least one concrete decision class at least one concrete data class as a prerequisite to activation or completion of said one concrete decision class, thereby establishing an interdependence between said one concrete decision class requiring data modeled by said at least one concrete data class and a concrete decision class modeling the decision situation providing said data, and, with either alternative;
  providing a user of said method for modeling with an ability to generate additional subclasses of said abstract classes.

2. The method of claim 1 further comprising:
  providing a decision role class modeling the participation of participants in each said decision situation,
  relating said decision role class to each said decision class,
  specializing said decision role class into at least two subclasses, each with differing behaviors, and
  defining for each specialized decision role class, communication requirements among incumbents of roles participating in said decision situation, and rights of each such specialized role class incumbent with respect to said incumbent's participation in said each said decision situation.

3. A computer implemented method of modeling and managing decision-making processes among a plurality of participants comprising:
  providing a network whose nodes are abstract decision situations,
  requiring said nodes to support participation of multiple persons in differentiated roles in each of said abstract decision situations, and
  providing arcs directed by decisions based on logical precedence.

4. The method of claim 3, further comprising
  requiring that incumbents of exactly one differentiated role make a choice modeled by said abstract decision situation, and
  requiring that incumbents of a second differentiated role have notice, elapsed time and access to incumbents of the first role prior to the incumbents of said first role having made said choice,
  requiring that incumbents of a third differentiated role have an opportunity to inspect results of the choice made by the incumbents of the first role after said choice, and to accept or reject said results, with or without reference to established criteria, and
  requiring that incumbents of a fourth differentiated role have timely notice of results of the choice made by the incumbents of the first role after said choice.

5. The method of claim 4, further comprising
  requiring that incumbents of a fifth differentiated role have an opportunity to inspect the results of the choice made by the incumbents of the first role, and to accept or reject said results according to its conformance or non-conformance to established criteria for said results.

6. The method of claim 1 further comprising
  providing a rule class as a subclass of the data class, and at least one of:
  (A) providing that instances of said rule class may be specified by a concrete decision class for use to completely determine the result of instances of said decision class by choosing the value of its associated decision's data object, and
  (B) contingently determine at least one of (i) the associated decision object's requirement for some other specific data object, (ii) the associated decision object's association with a specific role object, (iii) the incumbent of a specific role object associated with said decision object, and (iv) the use of a different rule object associated with said decision object.

7. A method for managing work processes comprising
  using an object-oriented application framework to build and configure decision process models comprised of interdependent decisions,
  rendering said process models as elements of a computer-based system in support of the work process,
  instantiating project models as instances of said process models,
  rendering said process models as directed graphs, whose nodes are concrete classes modeling decisions, and whose directed arcs or edges model dependencies between the nodal classes, and
  rendering said project models as a partition of the graph of the instantiating process, where such partition is defined by a specified node from the process graph and all and only those other nodes that are dependent on said specified node, and rendering said project models as elements of a computer-based system in support of the work process.

8. A computer implemented method of modeling and managing work processes comprising using a network or graph whose nodes are abstract decision situations representing choices to be made, which choices are modeled by concrete decision classes and by instances of those classes, and providing arc objects directed in each instance by an ordered pair of concrete decision classes associated with each arc object, where an entry or initial member of said ordered pair produces a data result required by an exit or terminal member of said ordered pair.

9. The method of claim 8 further comprising requiring each concrete decision class to support participation of multiple persons in differentiated roles.

10. The method of claim 9, further comprising requiring that incumbents of one differentiated role associated with a concrete decision class, make the choice modeled by said concrete decision class, and requiring that incumbents of a second differentiated role associated with said concrete decision class, have notice, elapsed time and access to the incumbents of the first role prior to the incumbent of said first role having made said choice, requiring that incumbents of a third differentiated role associated with said concrete decision class, have opportunity to inspect the results of the choice made by the incumbents of the first role after said choice, and to accept or reject said results without or without reference to established criteria, and requiring that incumbents of a fourth role associated with said concrete decision class, have timely notice of the results of the choice made by the incumbents of the first role after said choice has been made.

11. The method of claim 10, further comprising requiring that incumbents of a fifth differentiated role associated with said concrete decision class, have the opportunity to inspect the results of the choice made by the incumbents of the first role after said choice, and to accept or reject said results, but only according to its conformance or non-conformance to established criteria.

12. An object-oriented application framework for building work process models comprising (a) an abstract, extensible decision class which encapsulates the common attributes and methods needed to model a decision or choice to be made, and an abstract, extensible data class which encapsulates the common attributes and methods needed to model a data result produced by the decision, or alternatively, (b) a single abstract, extensible class which combines the attributes and methods of said abstract decision and data classes.

13. The framework of claim 12 further comprising a concrete directed arc class, which encapsulates the attributes and methods needed to model a dependency relationship between concrete decision classes, or instances of those classes, at the nodes of the directed arc instances, where such dependency arises from the requirement by one decision, the terminal or exit decision, for data produced by another decision, the initial or entry decision.

14. The framework of claim 13 further comprising an abstract decision role class which encapsulates common attributes and methods needed to model participation of people in a decision modeled by a concrete decision class.

15. The framework of claim 14 further comprising a concrete decision manager class as one specialization of the decision role class, where the role model by said decision manager class has a right to make a decision or choice modeled by the associated concrete decision class.

16. The framework of claim 15 further comprising a concrete approver class as an additional specialization of the decision role class, where the role modeled by said approver class has a right to veto said decision or choice.

17. The framework of claim 16 further comprising a concrete consultee class as an additional specialization of the decision role class, where the role model by said consultee class has a right to an opportunity to influence the decision or choice before said choice is made, but not the opportunity to veto said decision or choice.

18. The framework of claim 17 further comprising a concrete informee class as an additional specialization of the decision role class, where the role model by said informee class has a right to be timely informed of the result of making said decision or choice.

19. The framework of claim 18 further comprising a concrete inspector class as an additional specialization of the decision role class, where the role model by said inspector class has a right to veto said decision or choice, but only as it fails to meet established criteria.

20. The framework of claim 12 further comprising a concrete rule class as a specialization of the data class, where an instance of said rule class may be specified by a concrete decision class for use in (a) making a decision or choice modeled by said decision class, (b) contingently determining a dependency of the decision modeled by said decision class on the result of a decision modeled by some other concrete decision class, or (c) contingently determining participation and role of persons in the decision or choice modeled by said concrete decision class.

21. A method for managing one or more work process comprising:

constructing a computer-based process model for each of said one or more work processes, wherein each said process model includes at least two instances of a first network; and requiring that each of said at least two instances of said first network be comprised of three or more nodes;

requiring that a first node of said three or more nodes model an activity of one of said one or more work processes;

requiring that a second node of said three or more nodes model behaviors of a first role of a first participant in said activity;

requiring that a third node of said three or more nodes model behaviors of a second role of a second participant in said activity; and using each of said computer-based process models to support at least one execution, control and improvement of said one or more work processes.

22. The method of claim 21 further comprising:

modeling each of said one or more work processes as a second network, wherein said at least two instances of said first network comprise the nodes of said second network.

23. The method of claim 22 further comprising:

requiring that said behaviors of said first role be identically defined for every instance of said first role modeled by an instance of said second node of said three or more nodes in each of said at least two instances of said first network; and requiring that said behaviors of said second role be identically defined for every instance of said second role modeled by an instance of said third node of said three or more nodes in each of said at least two instances of said first network.

24. The method of claim 23 further comprising:

requiring that said first node of said three or more nodes be a concrete object class;

using each said computer-based process model to generate one or more project models, wherein each of said one or more project models is an instance of a computer-based process model from which said each of said one or more project models has been generated; and requiring that each of said one or more project models have an object instance of each concrete object class in said each of said one or more project models, in place of one or more occurrences of said each concrete object class in a computer-based process model from which said each of said one or more project models was generated.

25. A method for managing one or more work process comprising:

constructing a computer-based process model of each of said one or more work processes;

requiring that each of said process models includes one or more models of decision situations in one of said one or more work processes, wherein each of said decision situations requires a choice to be made;

requiring that each of said process models model participation of one or more persons in said each of said decision situations, said participation being modeled as at least two decision roles;

requiring that each of said at least two decision roles be associated with said each of said decision situations;

requiring that said each of said at least two decision roles have defined behaviors;

requiring that said defined behaviors of said each of said at least two decision roles be differentiated from said defined behaviors of every other one of said at least two decision roles;

requiring that said defined behaviors be invariant with respect to all of said decision situations; and using each of said computer-based process models to support at least one of execution, control and improvement of said one or more work processes.

26. The method of claim 25 further comprising:

requiring that said behaviors of each of said at least two decision roles include at least one of (i) a right of said role with respect to making a choice, (ii) a right of said role with respect to rejecting a choice, (iii) a right of said role with respect to an opportunity to influence a choice and, (iv) a right of said role with respect to being informed of a choice.

27. The method of claim 25 further comprising:

requiring that one of said at least two decision roles support participation of one or more persons in a decision manager role;

requiring that said one or more persons participating in said decision manager role make a choice anticipated by said decision situation associated with said decision manager role;

requiring that a second of said at least two decision roles support participation of persons in a consultee role in said decision situation associated with said decision manager role requiring that each of said persons participating in said consultee role be responsible for providing each of said persons participating in said decision manager role with information relevant to said decision situation;

requiring that said persons participating in said decision manager role give each of said persons participating in said consultee role: (i) a notice that said choice to be made required by said decision situation is impending, and (ii) sufficient time between providing said notice and making said choice for said persons participating in said consultee role to have provided said information to said persons participating in said decision manager role; and requiring that, at the option of one or more persons constructing said computer-based process model containing said decision situation with which said any role is associated, there be zero or more persons in any one of said at least two decision roles other than said decision manager role.

28. The method of claim 27 further comprising:

requiring that a third of said at least two decision roles support participation of persons in an approver role;

requiring that each of said persons participating in said approver role be given a first notice of a result of said choice to be made by said persons participating in said decision manager role; and requiring that each of said persons participating in said decision manager role refrain from implementing said choice until each of said persons participating in said approver role have given their approval of said choice.

29. The method of claim 28 further comprising:

requiring that a fourth of said at least two decision roles support participation of persons in an informee role; and requiring that each of said persons participating in said informee role be given a second notice of said result of said choice made by said persons participating in said decision manager role.

30. The method of claim 29 further comprising:

requiring that a fifth of said at least two decision roles support participation of persons in an inspector role;

requiring that each of said persons participating in said inspector role be given a third notice of said result of said choice to be made by said persons participating in said decision manager role; and requiring that each of said persons participating in said decision manager role refrain from implementing said result until said persons participating in said inspector role have accepted said result, wherein said acceptance shall be based exclusively on the conformance of said result to one or more predetermined criteria for said result.

31. The method of claim 30 further comprising:

requiring that one or more predetermined criteria include one or more requirements relating to a context of said decision situation, including, (i) in a context requiring production of a document, that copyright and trademark notice be displayed on said document, and (ii) in a context requiring design of a product label, that colors specified for various segments of said product label be in accordance with a label specification policy.

32. The method of claim 25 wherein said decision situations include a first decision situation and further comprises:

requiring, at the option of one or more persons constructing one of said computer-based process models which includes a model of said first decision situation, that a first choice required by said first decision situation be made by specifying that a result of a second decision situation of said decision situations be used as a rule to determine a result of said choice required by said first decision situation.

33. The method of claim 32 further comprising:

requiring, at the option of one or more persons constructing said one of said computer-based process model which includes said model of said first decision situation, that said first decision situation have a requirement for a result of a third decision situation a prerequisite to said choice required by said first decision situation;

requiring, at the option of one or more persons constructing said one of said computer-based process model which includes said model of said first decision situation, that said requirement for said result of said third decision situation be contingent on a result of a fourth decision situation, wherein said result of said fourth decision situation is used as a rule to determine said requirement of said first decision situation;

requiring, at the option of one or more persons constructing said one of said computer-based process model which includes said model of said first decision situation, that an association of a decision role with said first decision situation be contingent on a result of a fifth decision situation, wherein said result of said fifth decision situation is used as a rule to determine said association of said decision role with said first decision situation; and requiring, at the option of one or more persons constructing said one of said computer-based process model which includes said model of said first decision situation, that selection of a person participating in a decision role associated with said first decision situation be contingent on a result of a sixth decision situation, wherein said result of said sixth decision situation is used as a rule to determine said selection of said person participating in said decision role associated with said first decision situation.

34. The method of claim 25 further comprising:

requiring that each of said one or more models of decision situations be a concrete decision object class;

using each said computer-based process model to generate one or more project models, wherein each of said one or more project models is an instance of said each said computer-based process model from which said each of said one or more project models was generated; and requiring that said each of said one or more project models have a decision object instance of each concrete decision object class in said each of said one or more project models, in place of one or more occurrences of said each concrete decision object class in said each said computer-based process model from which said each of said one or more project models has been generated.

35. The method of claim 34 further comprising:

providing a superclass of said concrete decision object class; and requiring that all said concrete decision object classes be generated by customizing said superclass.

36. The method of claim 35 further comprising:

providing an application framework to support construction of said one or more process models;

requiring that said framework include said superclass of said concrete decision object classes;

requiring that said framework include two or more concrete decision role object classes; and requiring that each of said two or more concrete decision role object classes models behaviors defined for one of said at least two decision roles.

37. A method for managing one or more work process comprising:

constructing a computer-based process model of each of said one or more work processes, wherein each said process model includes a network with a concrete object class each node of said network;

providing a customizable object class encapsulating common attributes and methods required to model a work element of any one of said one or more work processes;

generating said concrete object class at each said node of each said process model by customizing said customizable object class;

generating one or more project models from each said computer-based process model, wherein each of said one or more project models includes a network with an object instance of a concrete object class at each node;

requiring that each said object instance at the node of any of said one or more project models be an instance of said concrete object class at a corresponding node of said process model from which said project model has been generated; and using said process model and said one or more project models in support of at least one of execution, control and improvement of said one or more work processes.

38. The method of claim 37 further comprising using said customizable object class to model a decision situation requiring choice;

generating two or more concrete decision object classes by customizing said customizable object class; and requiring that each said concrete decision object class and each object instance of said concrete decision object class, support participation of one or more persons in each said decision situation.

39. The method of claim 38 further comprising:

requiring that said support of participation of one or more persons in said each said decision situation provide support for participation in two or more differentiated roles.

40. The method of claim 39 further comprising:

defining behaviors of each of said two or more differentiated roles in a concrete decision role object class; and providing a decision role object instance of a concrete decision role object class in both said process and said project models to model each instance of a decision role associated with a decision situation.

41. The method of claim 40 further comprising:

requiring that said behaviors of each of said two or more differentiated role include at least one of (i) a right of said role with respect to making a choice, (ii) a right of said role with respect to rejecting a choice, (iii) a right of said role with respect to an opportunity to influence a choice, and (iv) a right of said role with respect to being informed of a choice.

42. The method of claim 40 further comprising:

requiring that incumbents of a first of said two or more differentiated roles make said choice modeled by said associated decision situation;

requiring that incumbents of a second of said two or more differentiated roles at least one of (i) receive a notice that said choice is impending, (ii) have a period of elapsed time between receiving said notice and making said choice, and (iii) have access to said incumbent of said first of said two or more differentiated roles during said period of elapsed time;

requiring that incumbents of a third of said two or more differentiated role have an opportunity to inspect said result of said choice made by said incumbent of said first of said two or more differentiated roles, after said choice has been made, and to reject said result without reference to predetermined criteria;

requiring that incumbents of a fourth of said two or more differentiated role receive a notice of said result, after said choice has been made; and requiring that the number of incumbents in any one of said two or more differentiated roles associated with any said decision situation be established by one or more persons constructing a computer-based process model which contains said any said decision situation, subject to the constraint that there be at least one incumbent of said first of said two or more differentiated roles and that there be zero or more incumbents of any of said two or more differentiated roles other than said first of said two or more differentiated roles.

43. The method of claim 42 further comprising:

requiring that incumbents of a fifth of said two or more differentiated roles have an opportunity to inspect said result, after said choice has been made, and to reject said result based exclusively on said result's failure to conform to one or more predetermined criteria for said result.

44. The method of claim 43 further comprising:

requiring that said one or more predetermined criteria include one or more requirements relating to a context of said decision situation, including, (i) in a context requiring production of a document, that copyright and trademark notices be displayed on said document, and (ii) in a context requiring design of a product label, that colors specified for various segments of said product label be in accordance with a label specification policy.

45. The method of claim 37 further comprising requiring, at the option of one or more persons constructing one of said computer-based process models, that a choice required by any one of said decision situations modeled by said computer-based model be made by specifying that a result of a second of said decision situations be used as a rule to determine a result of said choice required by said any one of said decision situations.

46. The method of claim 45 further comprising:

requiring, at the option of one or more persons constructing any one of said computer-based process models which includes a model of a first of said decision situations, that said first of said decision situations have a requirement for a result of a second of said decision situations, as a prerequisite to said choice required by said first of said decision situations;

requiring, at the option of one or more persons constructing said any one of said computer-based process models which includes said model of said first of said decision situations, that said requirement for said result of said second of said decision situations be contingent on a result of a third of said decision situations, wherein said result of said third of said decision situations is used as a rule to determine said requirement of said first of said decision situations;

requiring, at the option of one or more persons constructing said any one said computer-based process models which includes said model of said first of said decision situations, that an association of a decision role with said first of said decision situations, be contingent on a result of a fourth of said decision situations, wherein said result of said fourth of said decision situations is used as a rule to determine said association of said decision role with said first of said decision situations; and requiring, at the option of one or more persons constructing said any one of said computer-based process models which includes said model of said first of said decision situations, that selection of a person participating in a decision role associated with said first of said decision situations, be contingent on a result of a fifth of said decision situations, wherein said result of said fifth of said decision situations is used as a rule to determine said selection of said person participating in said decision role associated with said first of said decision situations.

* * * * *